United States Patent
Bentley et al.

(10) Patent No.: US 11,563,650 B2
(45) Date of Patent: Jan. 24, 2023

(54) DETERMINING OPTIMUM SOFTWARE UPDATE TRANSMISSION PARAMETERS

(71) Applicant: Oracle International Corporation, Redwood Shores, CA (US)

(72) Inventors: John Matthew Lloyd Bentley, Reading (GB); Sanjeev R. Sondur, Horsham, PA (US); Raja Ramaswamy, Bengaluru (IN); Nitin B. Agrawal, Mountain House, CA (US)

(73) Assignee: Oracle International Corporation, Redwood Shores, CA (US)

(*) Notice: Subject to any disclaimer, the term of this patent is extended or adjusted under 35 U.S.C. 154(b) by 84 days.

(21) Appl. No.: 17/244,946

(22) Filed: Apr. 29, 2021

(65) Prior Publication Data

US 2021/0250254 A1    Aug. 12, 2021

Related U.S. Application Data

(63) Continuation of application No. 16/586,710, filed on Sep. 27, 2019, now Pat. No. 11,032,161.

(60) Provisional application No. 62/899,901, filed on Sep. 13, 2019.

(51) Int. Cl.
*H04L 41/5025* (2022.01)
*H04L 67/00* (2022.01)
*H04L 41/5054* (2022.01)
*H04L 41/14* (2022.01)
*H04L 41/16* (2022.01)
*H04L 41/082* (2022.01)

(52) U.S. Cl.
CPC ........ *H04L 41/5025* (2013.01); *H04L 41/082* (2013.01); *H04L 41/145* (2013.01); *H04L 41/16* (2013.01); *H04L 41/5054* (2013.01); *H04L 67/34* (2013.01)

(58) Field of Classification Search
CPC ...... H04L 41/082; H04L 41/145; H04L 41/16
See application file for complete search history.

(56) References Cited

U.S. PATENT DOCUMENTS

| | | | |
|---|---|---|---|
| 9,063,818 B1* | 6/2015 | Risbood | G06N 20/00 |
| 9,794,145 B2* | 10/2017 | Vasseur | H04L 41/145 |
| 10,581,667 B2 | 3/2020 | Ahmed et al. | |
| 2005/0036443 A1 | 2/2005 | Collins | |
| 2019/0312800 A1 | 10/2019 | Schibler et al. | |

* cited by examiner

*Primary Examiner* — Esther B. Henderson
(74) *Attorney, Agent, or Firm* — Invoke

(57) ABSTRACT

Optimum software update transmission parameters are determined and used for transmitting a software update from a host to servers of a computer network. The software update is transmitted while the servers are live and required to meet certain quality of service requirements for tenants of the computer network. Transmission parameters for transmitting the software update are adjusted and updated based on service performance data. Based on iterative adjustments, optimum transmission parameters may be determined. Additionally or alternatively, machine learning is used to generate a model that determines predicted optimum transmission parameters. The predicted optimum transmission parameters may be initially used for transmitting a software update, while the transmission parameters continue to be adjusted throughout transmission.

20 Claims, 13 Drawing Sheets

Training Set 900

| Time | Software Update Identifier | Software Update Attribute | Tenant | Average Service Performance Data | QoS Requirement | Average Software Update Transmission Data |
|---|---|---|---|---|---|---|
| 10:00 | #123 | Normal | A | 29 ms | 30 ms | 30 Mbps |
| | | | B | 35 ms | 40 ms | |
| | | | C | 40 ms | 50 ms | |
| 10:05 | #123 | Normal | A | 30 ms | 30 ms | 31 Mbps |
| | | | B | 38 ms | 40 ms | |
| | | | C | 45 ms | 50 ms | |
| 10:10 | #123 | Normal | A | 31 ms | 30 ms | 32 Mbps |
| | | | C | 48 ms | 50 ms | |
| 12:30 | #124 | High | D | 26 ms | 25 ms | 30 Mbps |
| | | | E | 48 ms | 45 ms | |
| 12:35 | #124 | High | D | 25 ms | 25 ms | 29 Mbps |
| | | | E | 46 ms | 45 ms | |

DETERMINING OPTIMUM SOFTWARE UPDATE TRANSMISSION PARAMETERS

INCORPORATION BY REFERENCE; DISCLAIMER

Each of the following applications are hereby incorporated by reference: application Ser. No. 16/586,710 filed on Sep. 27, 2019; application No. 62/899,901 filed on Sep. 13, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to software update transmission. In particular, the present disclosure relates to determining optimum software update transmission parameters.

BACKGROUND

In a cloud computing network, network resources are shared amongst multiple clients, which may be associated with multiple tenants. Clients request computing services from the cloud network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by clients of a particular tenant, and/or (c) the aggregated computing services requested of the cloud network.

A cloud network provider ensures that service to tenants of the cloud network satisfies certain quality of service (QoS) requirements. The QoS requirements may include for example a maximum latency, a minimum speed, a minimum availability, a level of redundancy, a level of security. Each tenant of the cloud network may have different QoS requirements, dependent upon a respective service agreement with the cloud network provider.

Network resources of a cloud network are updated periodically to provide new features and/or bug fixes. Updating network resources consumes central processing unit (CPU) usage, memory usage, and/or input-output (I/O) usage of the network resources. However, updates to the network resources should be performed with minimal disruption to the service levels provided to the tenants using the cloud network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
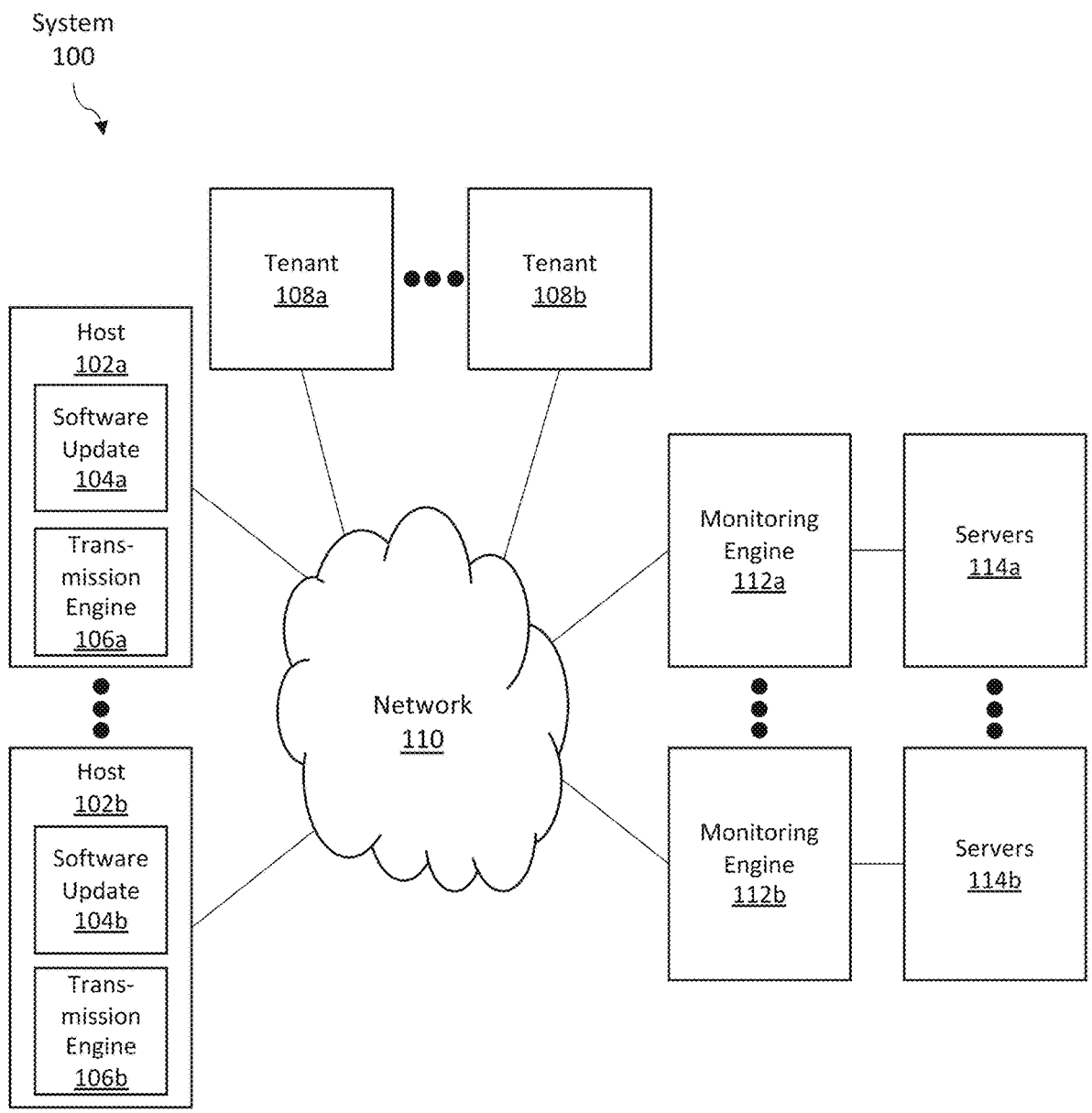
FIG. 1 illustrates a software update transmission system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SOFTWARE UPDATE TRANSMISSION SYSTEM ARCHITECTURE
2.1 TRANSMISSION ENGINE
2.2 OPTIMUM TRANSMISSION PARAMETER MODEL
3. DETERMINING OPTIMUM SOFTWARE UPDATE TRANSMISSION PARAMETERS
4. GENERATING AND APPLYING AN OPTIMUM TRANSMISSION PARAMETER MODEL
5. EXAMPLE EMBODIMENTS
6. COMPUTER NETWORKS AND CLOUD NETWORKS
7. HARDWARE OVERVIEW
8. MISCELLANEOUS; EXTENSIONS

1. General Overview

One or more embodiments include updating software update transmission parameters based on service performance data. A transmission engine obtains a software update to be transmitted and installed on a set of servers of a computer network. Initially, the transmission engine transmits a portion of the software update using a set of initial values for a set of transmission parameters. Examples of transmission parameters include a count of concurrent streams for transmitting the software update; a packet size of packets used for transmitting the software update; a time interval between the packets; recipient servers for receiving the concurrent streams. Service performance data associated with serving requests of tenants of the computer network, while transmitting the software update using the initial values for the transmission parameters, is determined. Based on a comparison between the service performance data and quality of service (QoS) requirements, a set of modified values for the set of transmission parameters is determined. As an example, if the service performance data exceeds the QoS requirements, then the values for the transmission parameters may be modified to reduce the runtime for transmitting the software update. Conversely, if the service performance data does not satisfy the QoS requirements, then the values for the transmission parameters may be modified to improve the service performance data. Subsequently, the transmission engine transmits another portion of the software update using the set of modified values for the set of transmission parameters. The values for the transmission parameters continue to be adjusted to address the dual goals of (a) minimizing transmission runtime and (b) ensuring the service performance data satisfy the QoS requirements. After completion of transmission of the software update to one or more servers, the software update is installed on the servers.

One or more embodiments include generating an optimum transmission parameter model for determining predicted optimum values for a set of transmission parameters. A machine learning algorithm is used to train an optimum transmission parameter model. A training set applied to the machine learning algorithm includes historical service performance data, historical QoS requirements, and historical software update transmission data. The historical service performance data, historical QoS requirements, and historical software update transmission data within the training set are time-aligned and tenant-aligned. Time alignment includes dividing the historical data into groups based on time periods. Service performance data, QoS requirements, and transmission data of a same time period are categorized into a same group. Tenant alignment includes dividing the historical data further into sub-groups based on tenants. Service performance data and QoS requirements of a same tenant are categorized into a same sub-group. The optimum transmission parameter model determines predicted optimum values for a set of transmission parameters. A transmission engine uses the predicted optimum values as initial values for the transmission parameters, as described above. The training engine may further adjust the values for the transmission parameters based on comparisons between service performance data and QoS requirements, as described above.

One or more embodiments include (a) using predicted optimum values, as determined by an optimum transmission parameter model, as initial values for a set of transmission parameters and (b) feeding back modified values for the set of transmission parameters, as determined based on a comparison between actual service performance data and QoS requirements, to re-train and update the optimum transmission parameter model. Hence, a transmission engine may adjust values for a set of transmission parameters using predicted optimum values, determined by an optimum transmission parameter model, as a starting point. Meanwhile, the optimum transmission parameter model may be updated at certain time intervals based on the adjusted values for the transmission parameters, determined by the transmission engine. The updated optimum transmission parameter model would thereby deliver more accurate predicted optimum values as an improved starting point for the transmission engine.

One or more embodiments described in this Specification and/or recited in the claims may not be included in this General Overview section.

2. Software Update Transmission System Architecture

FIG. 1 illustrates a software update transmission system, in accordance with one or more embodiments. As illustrated in FIG. 1, a system 100 includes a network 110, one or more hosts 102a, one or more tenants 108a-b, one or more monitoring engines 112a-b, one or more servers 114a-b. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a network 110 provides connectivity among a set of servers 114a-b, a set of tenants 108a-b, and a set of hosts 102a-b. Additional embodiments and/or examples relating to computer networks are described below in Section 6, titled "Computer Networks and Cloud Networks."

In one or more embodiments, a server (such as any of servers 114a-b) executes an application and/or storage system to respond to service requests made from one or more tenants 108a-b. A set of servers 114a-b constitute network resources of a cloud network. The servers 114a-b are shared amongst multiple clients of tenants 108a-b.

In one or more embodiments, a tenant (such as any of tenants 108a-b) is a corporation, organization, enterprise or other entity that accesses one or more shared computing resources, such as servers 114a-b. Each tenant is associated with one or more clients that request services of the servers 114a-b. In an embodiment, tenant 108a and tenant 108b are independent from each other. A business or operation of tenant 108a is separate from a business or operation of tenant 108b.

A tenant and a cloud network provider may have a contractual agreement requiring that the network services of the cloud network be provided to tenant at a certain minimum performance level, also referred to as "quality of service (QoS) requirements." QoS requirements may include for example a maximum latency, a minimum speed, a minimum availability, a level of redundancy, a level of security. Each tenant of the cloud network may have different QoS requirements, dependent upon a respective service agreement with the cloud network provider.

In one or more embodiments, a host (such as any of hosts 102a-b) is a hardware and/or virtual machine configured to transmit a software update (such as any of software updates 104a-b) to one or more servers 114a-b. Different hosts 102a-b may store different software updates 104a-b. A single host may store multiple software updates. Additionally or alternatively, multiple hosts 102a-b may store different portions of a same software update.

In one or more embodiments, a software update (such as any of software updates 104a-b) includes a set of code used for updating applications, programs, and/or services of one or more servers 114*a-b*. A software update may be used to add a function or feature to an application of a server. Additionally or alternatively, a software update may be used to fix a particular bug or error of a server.

A software update includes a set of executables and files. The set of executables and files may be stored within a hierarchy of directories. Additionally or alternatively, the set of executable and files may be stored within a package or compressed archive. Code within the set of executables and files may be organized as one or more classes, packages, and/or modules. The way the executables and files is organized and/or stored may affect the way in which the software update is launched and/or executed.

A software update is stored in a data repository associated with a host. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a host. Alternatively or additionally, a data repository 104 may be implemented or executed on a computing system separate from a host. The data repository 104 may be communicatively coupled to the host via a direct connection or via a network.

In one or more embodiments, a transmission engine (such as any of transmission engines 106*a-b*) refers to hardware and/or software configured to perform operations described herein for determining optimum software update transmission parameters. Optimum software update transmission parameters are determined based on service performance data detected by one or more monitoring engines 112*a-b*. A transmission engine is described in further detail with reference to FIG. 2. Examples of operations for determining optimum software update transmission parameters are described below with reference to FIGS. 5A-B.

A transmission engine is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

A transmission engine may be the same component as a host. Additionally or alternatively, a transmission engine may be a sub-component of a host.

In one or more embodiments, a count of a set of servers 114*a-b* of a computer network is unknown to the hosts 102*a-b* configured to transmit software updates to the servers 114*a-b*. The hosts 102*a-b* are unaware of the number of servers 114*a-b* that need to receive a particular software update. Indeed, the count of the set of servers 114*a-b* may be changing during the course of a transmission of a single software update. For example, servers 114*a-b* may be added due to a workload requested by tenants 108*a-b*. Additionally or alternatively, servers 114*a-b* may be removed due to malfunctioning or error.

In one or more embodiments, a monitoring engine (such as any of monitoring engines 112*a-b*) is configured to monitor the performance levels at which servers 114*a-b* are serving requests of tenants 108*a-b*. A monitoring engine hence detects service performance data for one or more tenants 108*a-b*. The service performance data is used to determine optimum software update transmission parameters.

2.1 Transmission Engine

Figure 2:
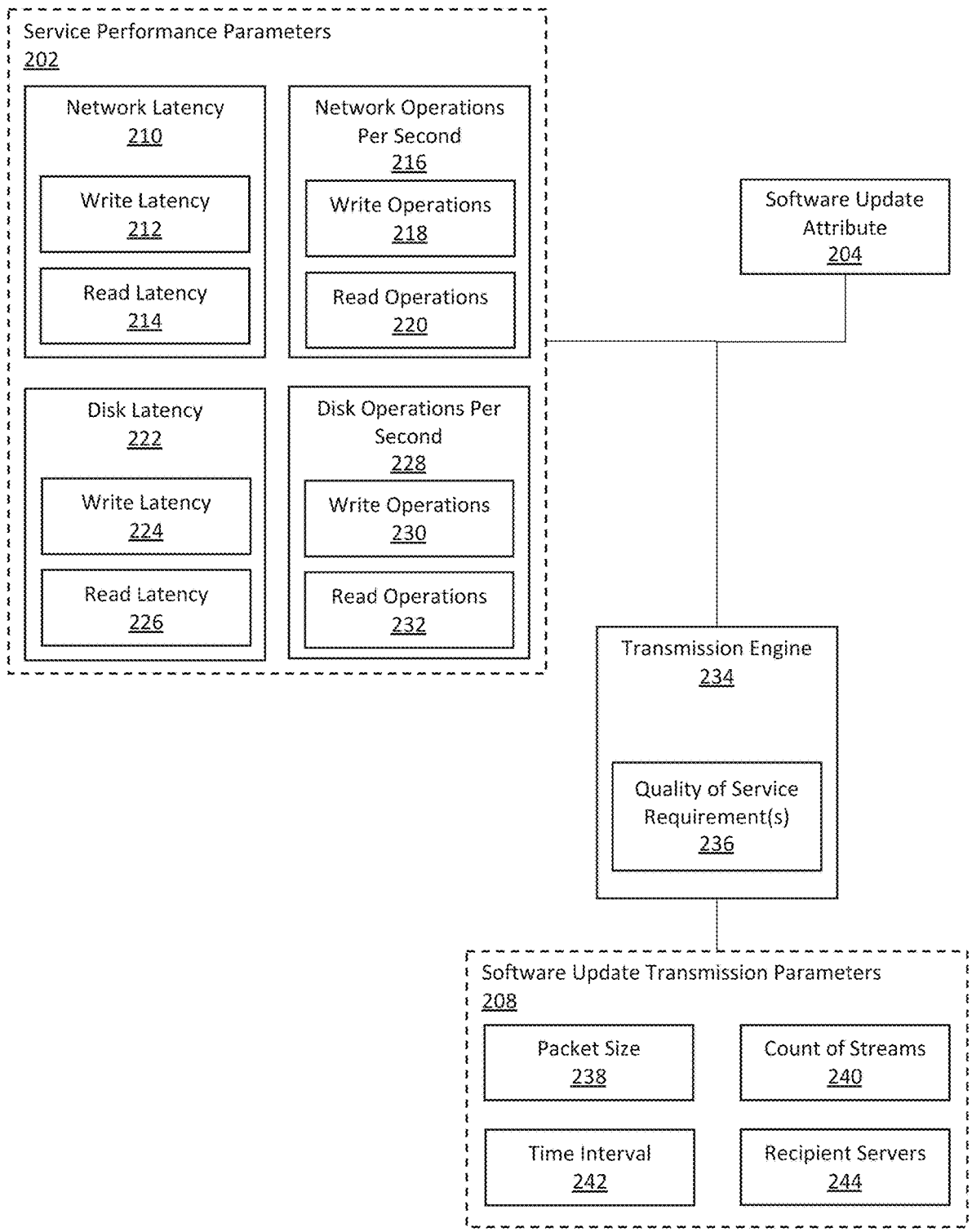
FIG. 2 illustrates an example transmission engine, in accordance with one or more embodiments.

FIG. 2 illustrates an example transmission engine, in accordance with one or more embodiments.

In one or more embodiments, a service performance parameter 202 is a type of information that indicates a performance level at which one or more servers are serving requests of one or more tenants. Service performance parameters 202 include, for example, network latency 210, network operations per second 216, disk latency 222, and disk operations per second 228. Service performance parameters 202 may pertain to write operations and/or read operations. Write operations are requests from client devices to write data to servers of a computer network. Write operations include requests to perform computations on certain data, to move files in a data storage, and/or to store data in a database. Read operations are requests from client devices to read data from servers of a computer network. Read operations include requests to display certain results on a user interface, and/or to retrieve data from a database or a data storage.

Network latency 210 refers to a latency of communications over a network (such as, network 110 of FIG. 1). Network latency 210 may refer to various metrics, such as, a duration of time between transmitting a message and receiving an acknowledgement for the message, a duration of time between transmitting a message to a recipient and receiving the message by the recipient, and/or a duration of time between transmitting a request to a server and receiving a response to the request from the server. Network write latency 212 refers to network latency 210 with respect to write operations, for example, a duration of time between transmitting a write request to a server and receiving a response to the write request from the server. Network read latency 214 refers to network latency 210 with respect to read operations, for example, a duration of time between transmitting a read request to a server and receiving a response to the read request from the server.

Network operations per second 216 refers to a count of operations processed and/or performed over a network (such as, network 110 of FIG. 1) per second. Network write operations per second 218 refers to a count of write operations processed and/or performed over a network per second. Network read operations per second 220 refers to a count of read operations processed and/or performed over a network per second.

Disk latency 222 refers to a latency associated with accessing a disk of a server. Disk write latency 224 refers to disk latency 222 with respect to write operations, for example, a duration of time between obtaining a write request by a server and generating a response to the write request by the server. Disk read latency 226 refers to disk latency 222 with respect to read operations, for example, a duration of time between obtaining a read request by a server and generating a response to the read request by the server.

Disk operations per second 228 refers to a count of operations processed and/or performed by a disk of a server per second. Disk write operations per second 230 refers to a count of write operations processed and/or performed by a disk per second. Disk read operations per second 232 refers to a count of read operations processed and/or performed by a disk per second.

In one or more embodiments, a software update attribute 204 is an attribute associated with a software update to be transmitted and installed on one or more servers. Examples of software update attributes include a size of the software update; a priority level of the software update; whether the software update is to add a new feature, fix a bug, and/or serve another purpose; and a type of application that the software update is intended to update.

In one or more embodiments, a software update transmission parameter 208 is a type of information that indicates a manner in which to transmit a software update (or portion thereof). Software update transmission parameters 208 include, for example, a packet size 238, a count of concurrent streams 240, a time interval 242 between packets, and recipient servers 244.

A packet size 238 refers to a size of a packet used for transmitting a portion of a software update from a host to a server. Using a larger packet size 238 may require consumption of more CPU usage, memory usage, and/or I/O usage, thereby resulting in a greater reduction in service performance levels. Using a smaller packet size 238 may require consumption of less CPU usage, memory usage, and/or I/O usage, thereby resulting in a lesser reduction in service performance levels.

A count of concurrent streams 240 refers to a number of parallel streams that are concurrently transmitting a packet of a software update. Using a greater count of concurrent streams 240 may require consumption of more CPU usage, memory usage, and/or I/O usage, thereby resulting in a greater reduction in service performance levels. Using a lesser count of concurrent streams 240 may require consumption of less CPU usage, memory usage, and/or I/O usage, thereby resulting in a lesser reduction in service performance levels.

A time interval 242 between packets refers to a duration of time between transmitting different packets of a software update. Using a lesser time interval 242 may require consumption of more CPU usage, memory usage, and/or I/O usage, thereby resulting in a greater reduction in service performance levels. Using a greater time interval 242 may require consumption of less CPU usage, memory usage, and/or I/O usage, thereby resulting in a lesser reduction in service performance levels.

A recipient server 244 refers to a server of a computer network that receives a stream of packets of a software update. Some servers may experience a greater reduction in service performance levels (as compared with other servers), caused by receiving and/or processing packets of a software update, due to various reasons. As an example, a server serving a greater load from tenants (compared with a server serving a lesser load from tenants) may experience a greater reduction in service performance levels, caused by receiving and/or processing packets of a software update. As another example, a server associated with more severe vulnerabilities (compared with a server associated with less severe vulnerabilities) may experience a greater reduction in service performance levels, caused by receiving and/or processing packets of a software update. Hence, selecting recipient servers 244, from a set of servers of a computer network, that are more greatly affected by receiving and/or processing packets of a software update, may result in a greater reduction in overall service performance levels. selecting recipient servers 244, from a set of servers of a computer network, that are less affected by receiving and/or processing packets of a software update, may result in a lesser reduction in overall service performance levels.

In one or more embodiments, as described above, a transmission engine 234 refers to hardware and/or software configured to perform operations described herein for determining optimum software update transmission parameters. A function, associated with a transmission engine 234, determines adjustments to values for software update transmission parameters 208 based on comparisons between (a) detected values for service performance parameters 202 and (b) QoS requirements 236. They function may determine a delta for adjusting values for software update transmission parameters 208 based on whether or not detected values for service performance parameters 202 satisfy QoS requirements 236.

A QoS requirement 236 is a minimum performance level required for one or more tenants of a computer network. QoS requirements 236 may include for example minimum thresholds for network latency 210, network operations per second 216, disk latency 222, and/or disk operations per second 228. QoS requirements 236 for a computer network may be stored in a data repository associated with a transmission engine 234.

A function for adjusting optimum software update transmission parameters based on a comparison between (a) detected values for service performance parameters 202 and (b) QoS requirements 236 may be selected and/or determined based on one or more software update attributes 204. As an example, a candidate set of functions for adjusting values for software update transmission parameters 208 may be associated with a transmission engine. One function may be selected, from the candidate set of functions, for transmitting a software update associated with a high priority. Another function may be selected, from the candidate set of functions, for transmitting a software update associated with a low priority.

2.2 Optimum Transmission Parameter Model

Figure 3:
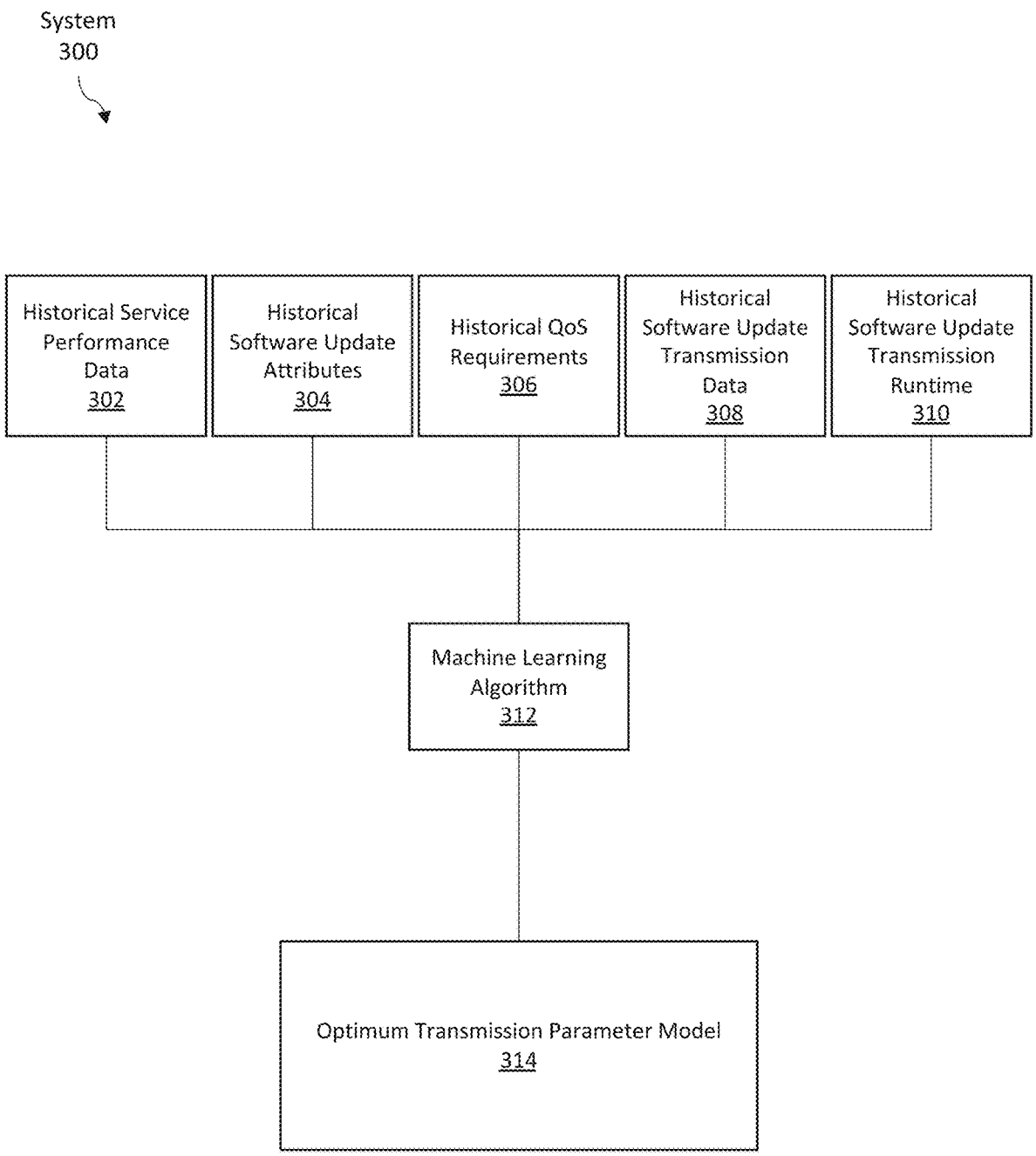
FIG. 3 illustrates a machine learning algorithm for generating an optimum transmission parameter model, in accordance with one or more embodiments.

FIG. 3 illustrates a machine learning algorithm for generating an optimum transmission parameter model, in accordance with one or more embodiments. As illustrated in FIG. 3, a machine learning system 300 includes historical service performance data 302, historical software update attributes 304, historical QoS requirements 306, historical software update transmission data 308, historical software update transmission runtimes 310, a machine learning algorithm 312, and an optimum transmission parameter model 314. In one or more embodiments, the system 300 may include more or fewer components than the components illustrated in FIG. 3.

In one or more embodiments, historical service performance data 302 includes service performance data for a historical time period. Historical service performance data 302 includes historical values for service performance parameters, such as network latency, network operations per second, disk latency, and/or disk operations per second. Historical service performance data 302 may include service performance data for one or more tenants of a computer network during a historical time period.

In one or more embodiments, historical software update attributes 304 include software update attributes over a historical time period. Historical software update attributes 304 may include attributes for one or more software updates transmitted during a historical time period.

In one or more embodiments, historical QoS requirements 306 include QoS requirements over a historical time period.

Historical QoS requirements 306 may include QoS requirements for one or more tenants of a computer network during a historical time period.

In one or more embodiments, historical software update transmission data 308 includes software update transmission data over a historical time period. Historical software update transmission data 308 includes historical values for software update transmission parameters, such as a packet size, count of streams, time interval between packets, and/or recipient servers. Historical software update transmission data 308 may include transmission data for one or more software updates transmitted during a historical time period.

Historical software update transmission data 308 may include values for software update transmission parameters that were determined based on comparisons between historical service performance data 302 and historical QoS requirements 306. Historical software update transmission data 308 may include values for software update transmission parameters that were determined by a transmission engine (such as, transmission engine 234 of FIG. 2).

In one or more embodiments, historical software update transmission runtimes 310 include runtimes for transmitting software updates over a historical time period. A transmission runtime represents a duration of time used from (a) the start of transmitting a software update to a set of servers of a computer network to (b) the completion of transmitting the software update to the set of servers of the computer network.

In one or more embodiments, historical data, such as historical service performance data 302, historical software update attributes 304, historical QoS requirements 306, historical software update transmission data 308, and/or historical software update transmission runtimes 310 is stored in one or more data repositories. The historical data forms a training set for training an optimum transmission parameter model 314 using a machine learning algorithm 312. The training set includes time-aligned and/or tenant-aligned groups of historical service performance data 302, historical software update attributes 304, historical QoS requirements 306, historical software update transmission data 308, and/or historical software update transmission runtimes 310.

Time alignment includes dividing the historical data into groups based on time periods. Service performance data, software update attributes, QoS requirements, transmission data, and transmission runtime of a same time period are categorized into a same group. Tenant alignment includes dividing the historical data further into sub-groups based on tenants. Service performance data and QoS requirements of a same tenant are categorized into a same sub-group. An example of a time-aligned and tenant-aligned training set is described below with reference to FIG. 9.

In one or more embodiments, a machine learning algorithm 312 is an algorithm that can be iterated to learn a target model f that best maps a set of input variables to an output variable. In particular, a machine learning algorithm 312 is configured to generate and/or train an optimum transmission parameter model 314. The optimum transmission parameter model 314 may include two functions f1 and f2 for determining different output variables, as follows.

A machine learning algorithm 312 generates an optimum transmission parameter model 314 such that the function f1 best fits the historical service performance data 302, historical software update attributes 304, and/or historical QoS requirements 306 to the historical software update transmission data 308. A machine learning algorithm 312 generates an optimum transmission parameter model 314 such that when the historical service performance data 302, historical software update attributes 304, and/or historical QoS requirements 306 are input into f1, the output of f1 best matches the historical software update transmission data 308.

Additionally or alternatively, a machine learning algorithm 312 generates an optimum transmission parameter model 314 such that the function f2 best fits the historical service performance data 302, historical software update attributes 304, historical QoS requirements 306, and/or historical software update transmission data 308 to the historical software update transmission runtimes 310. A machine learning algorithm 312 generates an optimum transmission parameter model 314 such that when the historical service performance data 302, historical software update attributes 304, historical QoS requirements 306, and/or historical software update transmission data 308 are input into f2, the output of f2 best matches the historical software update transmission runtimes 310.

A machine learning algorithm 312 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, and/or backpropagation.

In one or more embodiments, an optimum transmission parameter model 314 is trained by applying a machine learning algorithm 312 to historical data. An optimum transmission parameter model 314 may be any type of model, such as a regression model, a decision tree, and/or a neural network. Additional details regarding an optimum transmission parameter model 314 are further described below with reference to FIG. 4.

Figure 4:
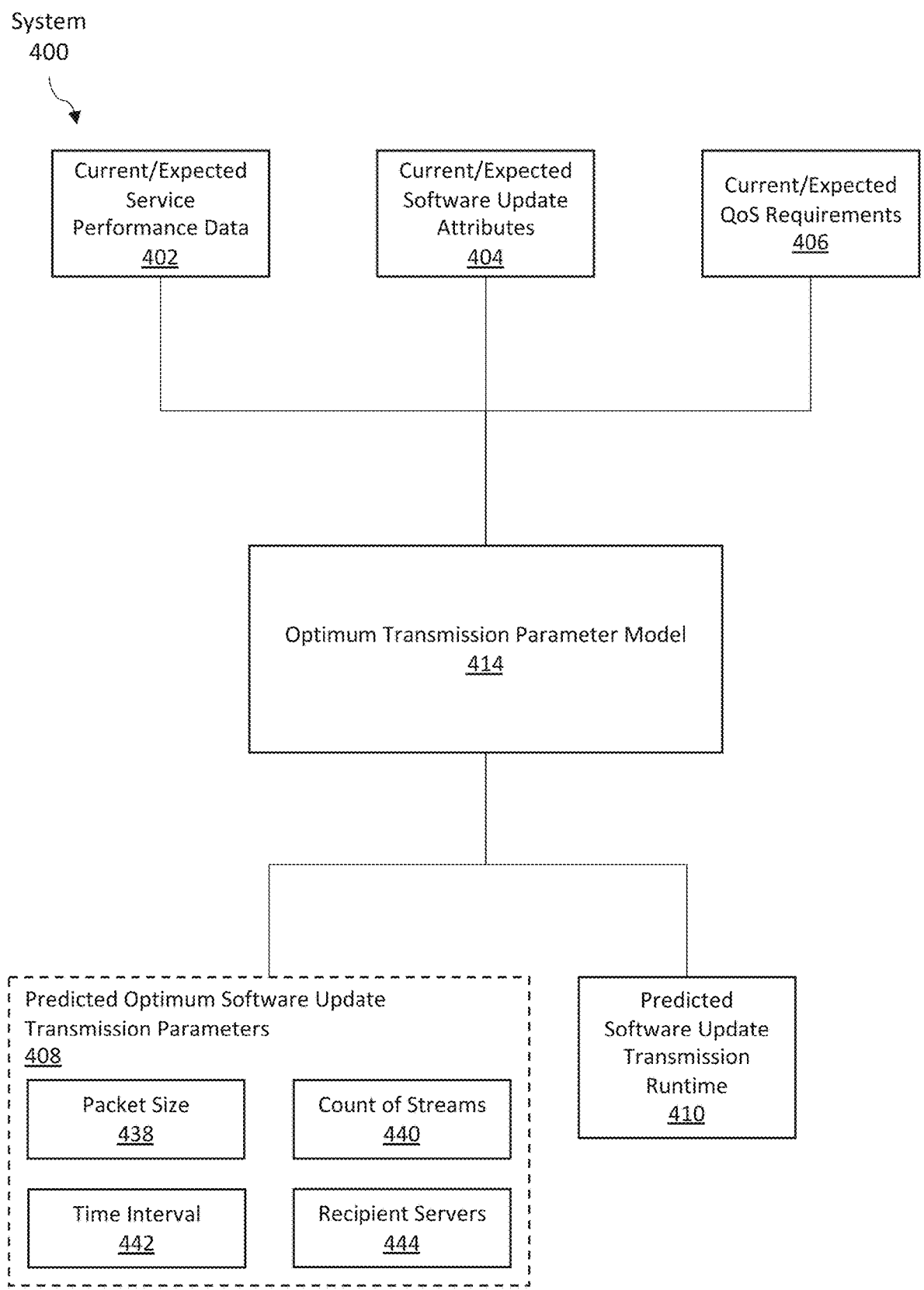
FIG. 4 illustrates an optimum transmission parameter model, in accordance with one or more embodiments.

FIG. 4 illustrates an optimum transmission parameter model, in accordance with one or more embodiments. As illustrated in FIG. 4, an optimum transmission parameter system 300 includes current and/or expected service performance data 402, current and/or expected software update attributes 404, current and/or expected QoS requirements 406, an optimum transmission parameter model 414, predicted optimum software update transmission parameters 408, and predicted software update transmission runtime 410. In one or more embodiments, the system 300 may include more or fewer components than the components illustrated in FIG. 3.

In one or more embodiments, current or expected service performance data 402 includes service performance data for a current time period or a future time period. Current or expected service performance data 402 includes current or expected values for service performance parameters, such as network latency, network operations per second, disk latency, and/or disk operations per second. Current values for service performance parameters may be detected by one or more monitoring engines. Expected values for service performance parameters may be determined based on past patterns or trends, manual user input, and/or other sources. Current or expected service performance data 402 may include service performance data for one or more tenants of a computer network during a current or future time period.

In one or more embodiments, current or expected software update attributes 404 include software update attributes over a current time period or a future time period. Current or expected software update attributes 404 may include attributes for one or more software updates being transmitted during a current time period, or to be transmitted during a future time period.

In one or more embodiments, current or expected QoS requirements 406 include QoS requirements over a current time period or a future time period. Current values for QoS requirements may be determined based on current contractual obligations between a cloud servicer provider and one or more tenants. Expected values for QoS requirements may be determined based on deals about to be closed between a cloud service provider and one or more tenants, and/or cloud services being marketed by a cloud service provider. Current or expected QoS requirements 406 may include QoS requirements for one or more tenants of a computer network during a current or future time period.

In one or more embodiments, an optimum transmission parameter model 414 defines values for a set of software update transmission parameters as a function of (a) service performance data, (b) software update attributes, and/or (c) QoS requirements. The values for software update transmission parameters, as determined by an optimum transmission parameter model 414, are predicted optimum software update transmission parameters 408. The predicted optimum software update transmission parameters 408 may include predicted optimum values for a packet size 438, a count of concurrent streams 440, a time interval 442 between packets, and/or recipient servers 444. A transmission engine may use the predicted optimum software update transmission parameters 408 for transmitting one or more software updates to one or more servers.

The predicted optimum software update transmission parameters 408 are referred to as being "predicted" because the predicted optimum software update transmission parameters 408 may be used as a best-guess as to what the optimum software update transmission parameters are. The predicted optimum software update transmission parameters 408 are input into a transmission engine (such as transmission engine 234 of FIG. 2) as an initial set of values for a set of software update transmission parameters. Meanwhile, the transmission engine may continually and/or periodically adjust the transmission parameters based on real-time feedback from monitoring engines and/or servers. The adjusted transmission parameters converge towards the actual optimum software update transmission parameters for any given time based on the real-time feedback.

Additionally or alternatively, an optimum transmission parameter model 414 defines a predicted software update transmission runtime 410 as a function of (a) service performance data, (b) software update attributes, (c) QoS requirements, and/or (d) software update transmission data. Predicted optimum software update transmission parameters 408, determined by an optimum transmission parameter model 414, may be one of the inputs into the function for determining a predicted software update transmission runtime 410. The predicted software update transmission runtime 410 is hence a predicted duration of time required for transmitting a software update using the predicted optimum software update transmission parameters 408.

In one or more embodiments, a feedback loop is implemented between a transmission engine and an optimum transmission parameter model 414. A transmission engine (such as transmission engine 234 of FIG. 2) uses predicted optimum software update transmission parameters 408 as an initial set of values for a set of software update transmission parameters. The transmission engine thereafter adjusts the values for the transmission parameters based on comparisons between (a) detected service performance data and (b) QoS requirements, as described above with reference to FIG. 2. Additionally, the modified values for the transmission parameters are incorporated into an updated training set and fed back into a machine learning algorithm (such as machine learning algorithm 312 of FIG. 3). The machine learning algorithm updates an optimum transmission parameter model 414 based on the updated training set.

3. Determining Optimum Software Update Transmission Parameters

Figure 5A:
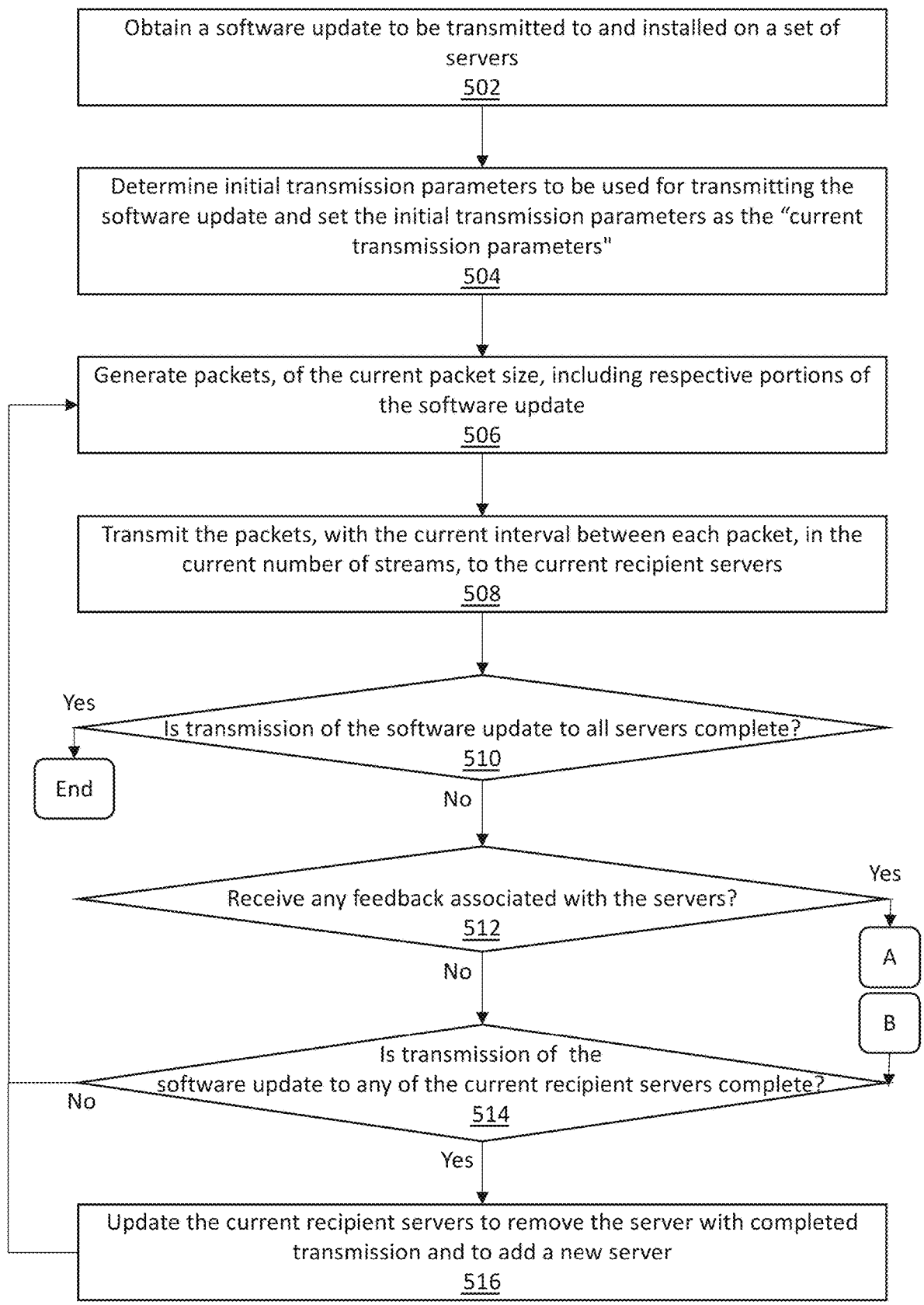
FIGS. 5A-B illustrate an example set of operations for determining optimum software update transmission parameters, in accordance with one or more embodiments.
Figure 5B:
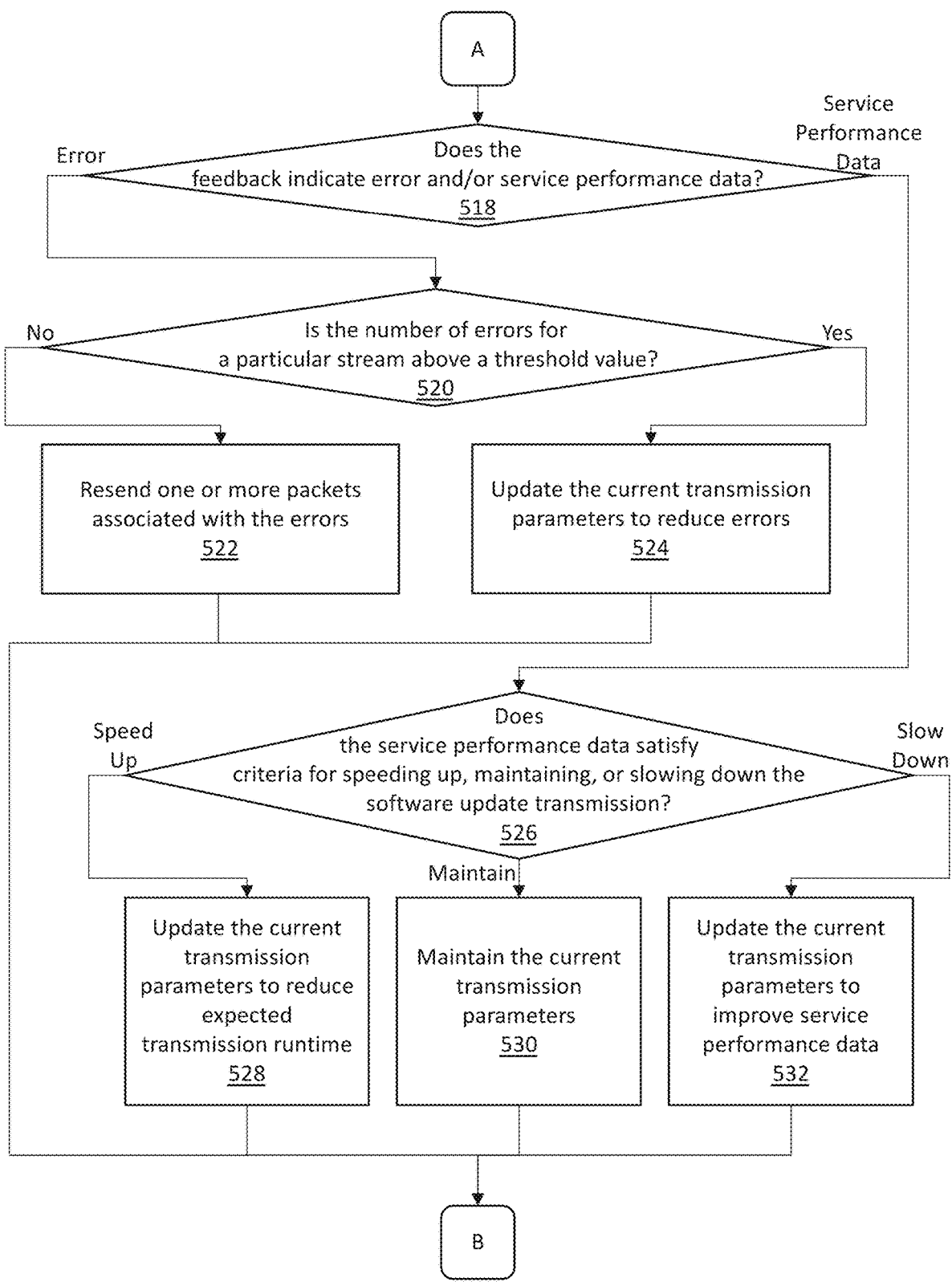

FIGS. 5A-B illustrate an example set of operations for determining optimum software update transmission parameters, in accordance with one or more embodiments. One or more operations illustrated in FIGS. 5A-B may be modified, rearranged, or omitted all together. Accordingly, the particular sequence of operations illustrated in FIGS. 5A-B should not be construed as limiting the scope of one or more embodiments.

One or more embodiments include obtaining a software update to be transmitted to and installed on a set of servers of a computer network (Operation 502). A transmission engine (and/or a host associated therewith) obtains a software update to be transmitted and installed on a set of servers. The transmission engine may obtain the software update from a user (such as a software developer who developed the software update) and/or an application (such as a software development application used to develop the software update).

One or more embodiments include determining initial transmission parameters to be used for transmitting the software update and setting the initial transmission parameters as the "current transmission parameters" (Operation 504).

The transmission engine determines initial transmission parameters. The transmission engine may determine the initial transmission parameters using an optimum transmission parameter model, as described below with reference to FIG. 7. Alternatively, the transmission engine may retrieve default values for the initial transmission parameters as stored in a data repository of the transmission engine. Alternatively, the transmission engine may apply a set of rules to determine the initial transmission parameters. As an example, a set of rules may determine initial transmission parameters based on software update attributes, time of day, tenant workload, and/or other factors.

The transmission engine sets the initial transmission parameters as the "current transmission parameters." The current transmission parameters may include, for example, the current packet size for packets transmitting portions of the software update; the current count of concurrent streams used for transmitting the packets; the current time interval between transmission of each packet; and the current set of recipient servers.

One or more embodiments include generating packets, of the current packet size, including respective portions of the software update (Operation 506). The transmission engine generates packets for transmitting the software update. The transmission engine uses the current packet size to generate the packets.

As an example, a size of a software update may be 20 GB. A current packet size may be 10 MB. A transmission engine may generate a first packet including the first 10 MB of the software update, and a second packet including the second 10 MB of the software update, and so on. If the current packet size is updated to, for example, 15 MB, then the transmission engine may identify 15 MB of the next set of content of the software update to be transmitted. The transmission engine may generate a next packet including the set of content, such that the packet size is 15 MB.

One or more embodiments include transmitting the packets, with the current time interval between each packet, in the current number of concurrent streams, to the current recipient servers (Operation 508).

The transmission engine transmits the packets with the current time interval between each packet. The transmission engine transmits one packet, waits for a time period equal to the current time interval, and then transmits a next packet.

The transmission engine transmits the packets in the current number of concurrent streams to the current recipient servers. As an example, a current number of concurrent streams may be three. The current recipient servers may be Server A, Server B, and Server C. A transmission engine may transmit a first packet in three concurrent streams to each of Server A, Server B, and Server C. The transmission engine may then transmit a second packet in three concurrent streams to each of Server A, Server B, and Server C. If the current recipient servers is updated to, for example, Server A, Server B, and Server D, then the transmission engine may transmit a third packet in three concurrent streams to each of Server A, Server B, and Server D. If the current number of concurrent streams is updated to, for example, four, and the current recipient servers is updated to, for example, Server A, Server B, Server C, and Server D, then the transmission engine may transmit a fourth packet in four concurrent streams to each of Server A, Server B, Server C, and Server D.

One or more embodiments include determining whether transmission of the software update to all servers is complete (Operation 510). The transmission engine determines whether transmission of the software update to all servers is complete.

Various ways of determining whether transmission of the software update to a particular server is complete may be used. The transmission engine may query a particular server to determine whether the particular server has received the complete software update. Alternatively, the transmission engine may query a network manager of the computer network to determine whether the particular server has received the complete software update. Alternatively, the transmission engine may track transmission of the software update to the particular server. The tracking information may include a number of bytes that have been transmitted to the particular server. If all bytes of the software update have been transmitted, the transmission engine may determine transmission of the software update to the particular server is complete. Alternatively, the transmission engine may receive an acknowledgement from the particular server indicating receipt of the complete software update. If the acknowledgement is received, the transmission engine may determine transmission of the software update to the particular server is complete. The above methods may be used separately or combined, and additional and/or alternative methods may be used. The transmission engine may apply the same method or different methods to each of the servers of the computer network to determine whether transmission of the software update to all servers is complete.

In an embodiment, after transmission of the software update to all servers is complete, the software update is installed on the servers. Installing the software update may include loading the software update into memory, executing a script to install the software update, and/or rebooting the servers.

If the software update has not been transmitted to all servers, then one or more embodiments include determining whether any feedback associated with the servers has been received (Operation 512). The transmission engine determines whether any feedback associated with the servers has been received. The feedback may be received from one or more monitoring engines of the computer network. The monitoring engines may monitor the service performance of the servers and/or errors generated by the servers. Additionally or alternatively, the feedback may be received directly from the servers. The servers may report service performance levels and/or errors directly to the transmission engine.

The transmission engine may obtain the feedback as soon as the feedback is generated and/or based on certain time intervals or schedules. As an example, a transmission engine may receive an error message as soon as the error message is generated by a server. As another example, a monitoring engine may monitor service performance data at regular time intervals, and transmit the service performance data periodically to a transmission engine.

One or more embodiments include determining whether the feedback indicates an error and/or service performance data (Operation 518). The transmission engine determines whether the feedback indicates an error, service performance data, or both.

The transmission engine may receive error data associated with the transmission of the software update and/or error data associated with the service provided by the computer network to one or more tenants.

If the feedback indicates one or more errors, then one or more embodiments include determining whether the number of errors for a particular stream is above a threshold value (Operation 520). The transmission engine compares the number of errors for a particular stream with a threshold value and determines whether the number of errors exceeds the threshold value.

If the number of errors for each concurrent stream is less than the threshold value, then one or more embodiments include resending one or more packets associated with the errors (Operation 522). Responsive to receiving feedback indicating an error regarding transmission of a particular packet in a particular stream to a particular recipient server, the transmission engine resends the particular packet to the particular recipient server. Hence, errors may be addressed as soon as the errors are detected. The transmission engine need not wait for other packets to be sent, much less for the entire software update to be sent. Additionally, only packets associated with errors need to be resent; the entire software update need not be resent.

If the number of errors for a concurrent stream is greater than the threshold value, then one or more embodiments include updating the current transmission parameters to reduce errors (Operation 524). If the number of errors for a particular stream is greater than the threshold value, then there may be a systemic or recurrent error associated with the particular stream and/or the particular server receiving packets on the particular stream. Hence, the transmission engine updates the current transmission parameters to reduce errors. The transmission engine may remove the particular server receiving packets on the problematic stream from the current set of recipient servers. The transmission engine may add other servers to the current set of recipient servers.

In other embodiments, a different criteria may be used at Operation 520. As an example, a transmission engine may determine an error type of an error indicated by the feedback. Certain error types may trigger updating the current transmission parameters to reduce errors at 524, while certain other error types might not trigger an update.

Returning to Operation 518, if the feedback indicates service performance data, then one or more embodiments include determining whether the service performance data satisfy one or more criteria for speeding up, maintaining, or slowing down the software update transmission (Operation 526). The service performance data may be evaluated using various criteria, examples of which are described below.

In an embodiment, the transmission engine retrieves, from a data repository, QoS requirements for each tenant of the computer network. The transmission engine identifies a respective set of service performance data and QoS requirements associated with each tenant. The transmission engine compares the service performance data for a particular tenant with the QoS requirements for the particular tenant. If the service performance data for at least a threshold number of tenants exceeds the respective QoS requirements, then the service performance data may be considered as satisfying criteria for speeding up the software update transmission. If the service performance data for at least a threshold number of tenants falls below the respective QoS requirements, then the service performance data may be considered as satisfying the criteria for slowing down the software update transmission. If neither scenario applies, then the service performance data may be considered as satisfying the criteria for maintaining the current transmission parameters for the software update transmission.

Additionally or alternatively, the transmission engine retrieves, from a data repository, an overall performance requirement for the computer network. The transmission engine determines overall and/or average service performance data across the computer network. The transmission engine compares the overall and/or average service performance data with the overall performance requirement for the computer network. If the overall and/or average service performance data exceeds the overall performance requirement by greater than a threshold value, then the service performance data may be considered as satisfying criteria for speeding up the software update transmission. If the overall and/or average service performance data falls below the overall performance requirement by greater than a threshold value, then the service performance data may be considered as satisfying criteria for slowing down the software update transmission. If neither scenario applies, then the service performance data may be considered as satisfying the criteria for maintaining the current transmission parameters for the software update transmission.

Additional and/or alternative criteria may be used for determining whether a next operation should be speeding up, maintaining, or slowing down the software update transmission.

If the service performance data satisfies criteria for speeding up the software update transmission, then one or more embodiments include updating the current transmission parameters to reduce expected transmission runtime (Operation 528). Reducing expected transmission runtime may include, for example, increasing a packet size of packets used for transmitting the software update; increasing the count of concurrent streams for transmitting the software update; decreasing a time interval between the packets; and/or modifying recipient servers for receiving the concurrent streams. Modifying recipient servers to reduce expected transmission runtime may include, for example, determining service performance data for each of the current recipient servers, and replacing the server with the worst service performance with another server.

In an embodiment, the transmission engine identifies a function that determines a delta associated with a particular transmission parameter based on a result of the comparison between (a) service performance data and (b) QoS requirements. The transmission engine applies the delta to a particular value for a particular transmission parameter. The delta may be a numerical value or a percentage value.

As an example, a comparison between service performance data and QoS requirements may indicate (a) network write latency for ten tenants satisfy respective QoS requirements for the ten tenants, (b) network write latency for five tenants do not satisfy respective QoS requirements for the five tenants, (c) disk write operations for eight tenants satisfy respective QoS requirements for the ten tenants, and (d) (c) disk write operations for two tenants do not satisfy respective QoS requirements for the two tenants. The transmission engine may input the above comparison result into a function. The function may determine that a delta for adjusting the packet size is +1 MB, and the delta for adjusting the time interval between packets is −0.1 ms. The transmission engine may update the current packet size by adding 1 MB and update the current time interval by subtracting 0.1 ms.

As an example, a comparison between service performance data and QoS requirements may indicate network write latency for ten tenants satisfy respective QoS requirements for the ten tenants. The transmission engine may input the above comparison result into a function. The function may determine that a delta for adjusting the packet size is +2%. The transmission engine may update the current packet size by increasing the current packet size by 2%.

In an embodiment, the transmission engine retrieves, from a data repository, a candidate set of functions for determining how to adjust transmission parameters. The transmission engine selects one of the candidate set of functions based on various factors.

As an example, a candidate set of functions may include a more aggressive function that makes greater adjustments to the current transmission parameters, and a less aggressive function that makes lesser adjustments to the current transmission parameters. If the service performance data indicates that the network write latency for ten tenants falls below the respective QoS requirements for the ten tenants, then the more aggressive function may indicate that the packet size should be increased by 2 MB. Meanwhile, if the service performance data indicates that the network write latency for ten tenants falls below the respective QoS requirements for the ten tenants, then the less aggressive function may indicate that the packet size should be increased by 1 MB.

A transmission engine may select one of the two functions based on software update attributes. If the software update is associated with a high priority, then the transmission engine may determine to use the more aggressive function. If the software update is associated with a low priority, then the transmission may determine to use the less aggressive function.

Additionally or alternatively, the transmission engine may select one of the two functions based on the type of service performance data that satisfies QoS requirements, and/or the type of service performance data that does not satisfy QoS requirements. If network write latency is the type of service performance data that does not satisfy QoS requirements, then the transmission engine may select the more aggressive function. If network read latency is the type of service performance data that does not satisfy QoS requirements, then the transmission engine may select the less aggressive function.

If the service performance data satisfies criteria for maintaining the software update transmission, then one or more embodiments include maintaining the current transmission parameters (Operation 530). The transmission engine determines that no change needs to be made to any of the transmission parameters.

If the service performance data satisfies criteria for slowing down the software update transmission, then one or more embodiments include updating the current transmission parameters to improve service performance data (Operation 532). Improving the service performance data may include reducing a packet size of packets used for transmitting the software update; reducing the count of concurrent streams for transmitting the software update; increasing a time interval between the packets; and/or modifying recipient servers for receiving the concurrent streams. Modifying recipient servers to improve the service performance data may include, for example, determining an error rate for each of the current recipient servers, and replacing the server with the worst error rate with another server.

In an embodiment, the transmission engine identifies a function that determines a delta associated with a particular transmission parameter based on a result of the comparison between (a) service performance data and (b) QoS requirements. The transmission engine applies the delta to a particular value for a particular transmission parameter. Examples for identifying a function that determines a delta for adjusting a transmission parameter are described above with reference to Operation 528.

In an embodiment, the transmission engine retrieves, from a data repository, a candidate set of functions for determining how to adjust transmission parameters. The transmission engine selects one of the candidate set of functions based on various factors. Examples for selecting a function, from a candidate set of functions, are described above with reference to Operation 528.

One or more embodiments include determining whether transmission of the software update to any of the current recipient servers is complete (Operation 514). The transmission engine determines whether transmission of the software update to any of the current recipient servers is complete. Examples for determining whether transmission of the software update to a particular server is complete are described above with reference to Operation 510. The transmission engine may apply the same method or different methods to each of the current recipient servers to determine whether transmission of the software update to any of the current recipient servers is complete.

In an embodiment, after transmission of the software update to a particular server is complete, the software update is installed on the particular server. Installation on the particular server may commence without waiting for the software update transmission to other servers to be completed. Installing the software update may include loading the software update into memory, executing a script to install the software update, and/or rebooting the servers.

One or more embodiments include updating the current recipient servers to remove the server with completed transmission and to add a new server (Operation 516). The transmission engine updates the current recipient servers to remove the server that has received the complete software update. The transmission engine also adds, to the current recipient servers, another server that has not yet received the complete software update.

In one or more embodiments, during the execution and iteration of Operations 502-532 of FIG. 5, servers may be added and/or removed from the computer network. Hence, a server added to the current recipient servers at any of Operations 524, 528, 532, and/or 516 may be a server that was newly spun up after an initial transmission of the software update to at least one of the servers of the computer network has begun. Since the transmission parameters are determined on an iterative basis, the same operations may be executed for determining the transmission parameters for servers existing at the beginning of the transmission process and servers added to the computer network during the transmission process. Meanwhile, servers removed from the computer network during the transmission process may be dropped at Operations 524, 528, and/or 532, as part of the same iterative process. Hence, even if the identity and/or count of servers of the computer network is unknown to the host and/or dynamically changing through the transmission process, the same Operations 502-532 of FIG. 5 may be used for determining and adjusting transmission parameters throughout the transmission process.

4. Generating and Applying an Optimum Transmission Parameter Model

Figure 6:
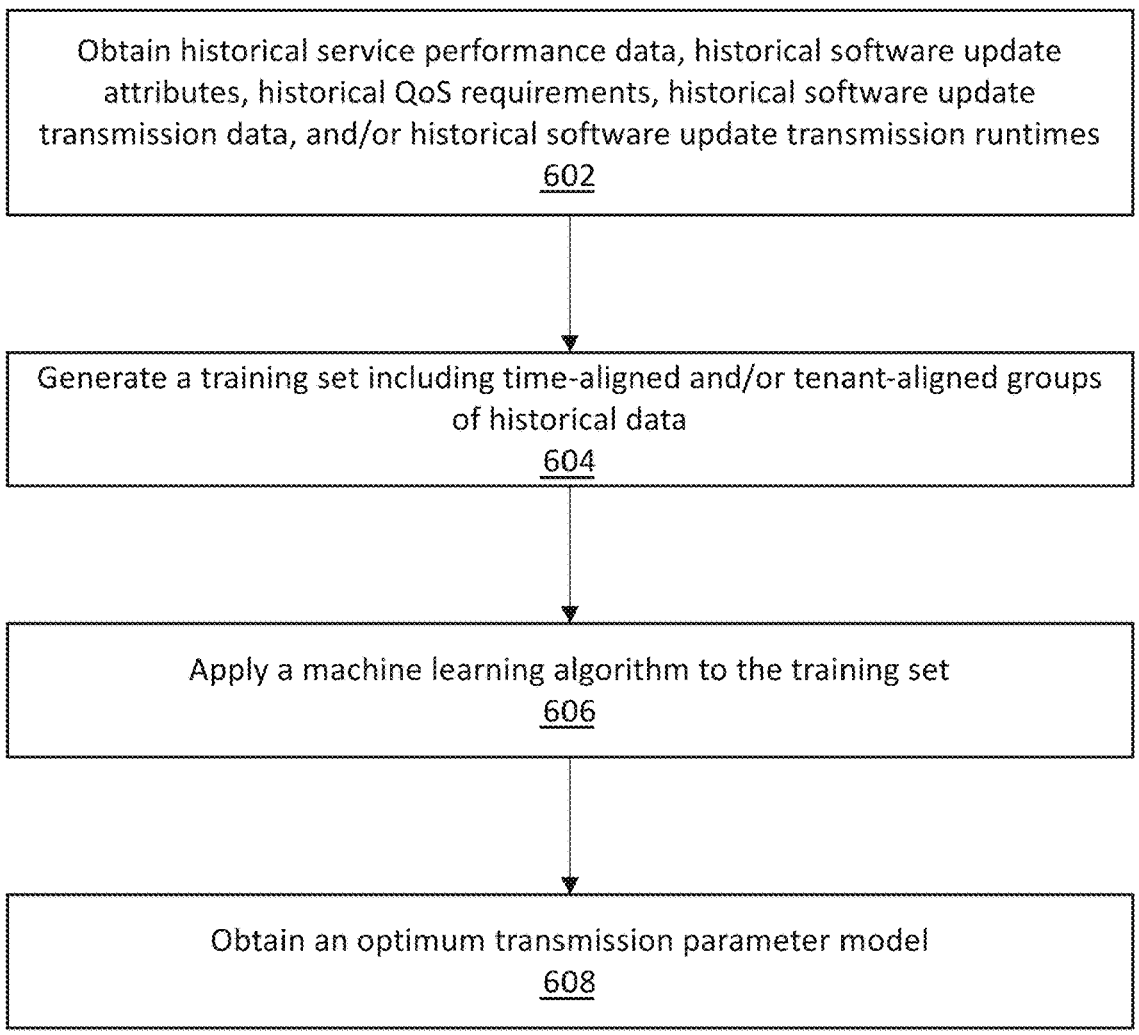
FIG. 6 illustrates an example set of operations for generating an optimum transmission parameter model using machine learning, in accordance with one or more embodiments.

FIG. 6 illustrates an example set of operations for generating an optimum transmission parameter model using machine learning, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include obtaining historical service performance data, historical software update attributes, historical QoS requirements, historical software update transmission data, and/or historical software update transmission runtimes (Operation 602). A machine learning system obtains historical data, such as historical service performance data, historical software update attributes, historical QoS requirements, historical software update transmission data, and/or historical software update transmission runtimes, from one or more data repositories. The historical data may be labeled with timestamps, tenant identifiers, and/or software update identifiers. At least a portion of the historical data may include historical values for software transmission parameters as determined using Operations 502-532 of FIG. 5.

One or more embodiments include generating a training set including time-aligned and/or tenant-aligned groups of historical data (Operation 604). The machine learning system generates a training set.

The machine learning system identifies a respective timestamp associated with each set of historical data. Sets of historical data associated with the timestamps within a particular time range are categorized into a same group. Additionally, the machine learning system identifies any tenant associated with each set of historical data. Sets of historical data associated with the same tenant are categorized into a same sub-group. An example of a time-aligned and tenant-aligned training set is described below with reference to FIG. 9.

One or more embodiments include applying a machine learning algorithm to the training set (Operation 606). The machine learning system applies a machine learning algorithm to the training set. As described above, various machine learning algorithms may be used. The machine learning algorithm is applied to learn one or more target models. In an embodiment, the machine learning algorithm is applied to learn a target model f1 that best maps a set of input variables (historical service performance data, historical software update attributes, and/or historical QoS requirements) to an output variable (historical software update transmission data). Additionally or alternatively, the machine learning algorithm is applied to learn a target model f2 that best maps a set of input variables (historical service performance data, historical software update attributes, historical QoS requirements, and/or historical software update transmission data) to an output variable (historical software update transmission runtimes).

One or more embodiments include obtaining an optimum transmission parameter model (Operation 608). The machine learning system obtains one or more target models using the machine learning algorithm. The target models form the optimum transmission parameter model.

Figure 7:
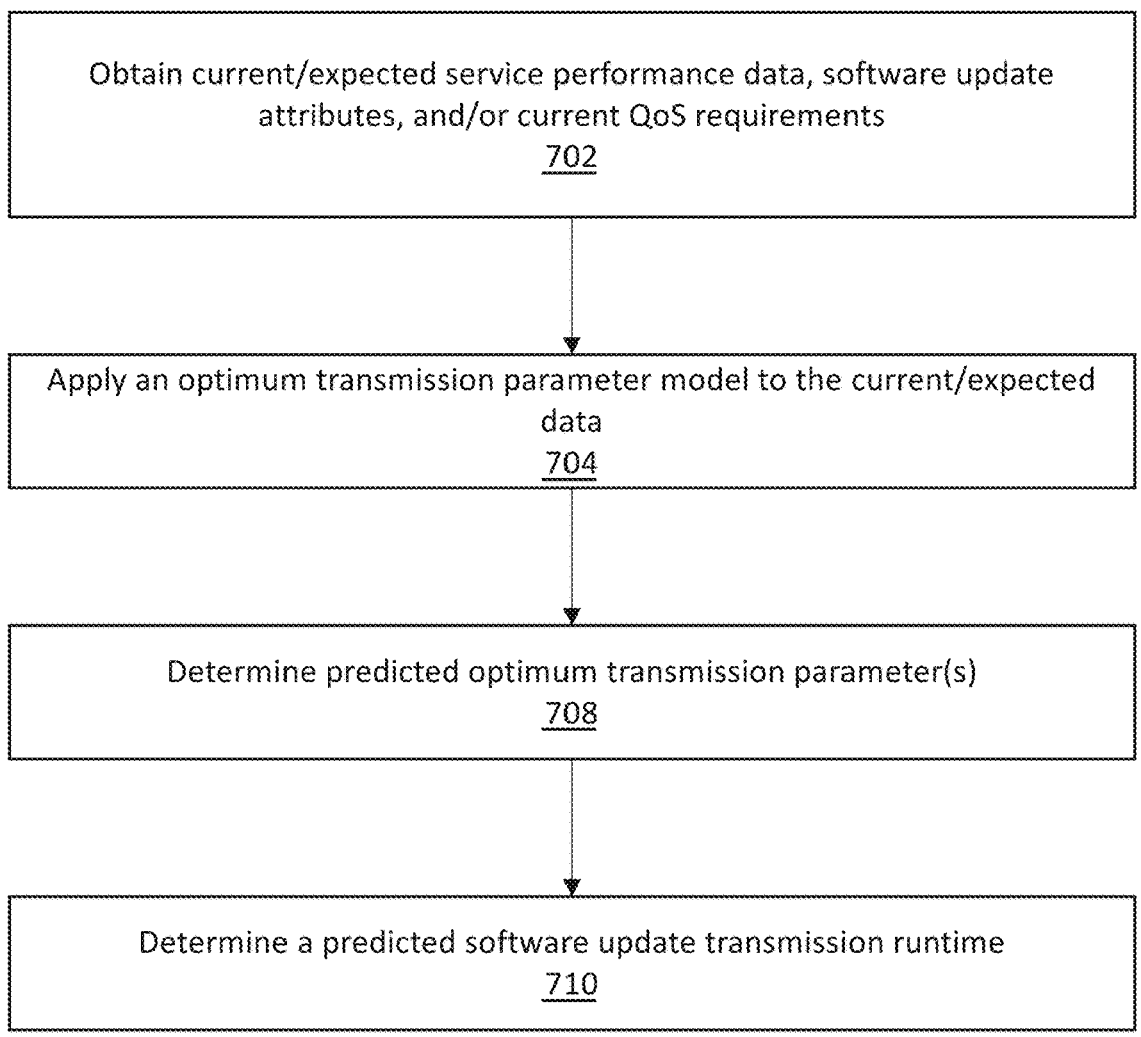
FIG. 7 illustrates an example set of operations for determining predicted software update transmission parameters using an optimum transmission parameter model, in accordance with one or more embodiments.

FIG. 7 illustrates an example set of operations for determining predicted software update transmission parameters using an optimum transmission parameter model, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include obtaining current and/or expected service performance data, current and/or expected software update attributes, and/or current and/or expected current QoS requirements (Operation 702).

An optimum transmission parameter system obtains current and/or expected data, such as current and/or expected service performance data, current and/or expected software update attributes, and/or current and/or expected current QoS requirements, from one or more data repositories.

In an embodiment, the optimum transmission parameter system obtains current service performance data from one or more monitoring engines. The monitoring engines may detect and/or collect service performance data. As an example, a monitoring engine may intercept a service request from a client device to a server. The monitoring engine may record a time at which the service request is detected. The monitoring engine may intercept a response to the service request from the server to the client device. The monitoring engine may record a time at which the response is detected. The monitoring engine may provide a difference between the request time and the response time as service performance data to the optimum transmission parameter system.

In an embodiment, the optimum transmission parameter system determines expected service performance data based on past patterns or trends, manual user input, and/or other sources. As an example, historical data may indicate a higher network latency for a computer network between 9 am and 10 am, and a lower network latency for the computer network between 10 am and 11 am. Based on the above pattern, expected service performance data for 9 am to 10 am may include high network latency, while expected service performance data for 10 am to 11 am may include low network latency.

In an embodiment, the optimum transmission parameter system determines current software update attributes based on current software updates being transmitted from a host to a server. The optimum transmission parameter system determines expected software update attributes based on software updates that are in queue for being transmitted and/or software updates that are currently being developed.

In an embodiment, the optimum transmission parameter system determines current QoS requirements based on current contractual obligations between a cloud service provider and one or more tenants. The optimum transmission parameter system may look up current contractual obligations from one or more data repositories.

In an embodiment, the optimum transmission parameter system determines current QoS requirements based on deals about to be closed between a cloud service provider and one or more tenants and/or services being marketed by a cloud service provider. The optimum transmission parameter system may look up such information from one or more data repositories.

In an embodiment, the current and/or expected data obtained at Operation 702 are associated with a same time period. The optimum transmission parameter system obtains current data to determine predicted optimum transmission parameters for the current time period. Alternatively, the optimum transmission parameter system obtains expected data for a particular future time period to determine predicted optimum transmission parameters for the particular future time period.

One or more embodiments include applying an optimum transmission parameter model to the current and/or expected data (Operation 704). The optimum transmission parameter system applies an optimum transmission parameter model to the current and/or expected data obtained at Operation 702. The optimum transmission parameter model may be determined based on operations as described above with reference to FIG. 6.

One or more embodiments include determining one or more predicted optimum transmission parameters (Operation 708). The optimum transmission parameter system inputs current and/or expected service performance data, software update attributes, and/or QoS requirements to a function f1 of the optimum transmission parameter model. The function f1 outputs one or more predicted optimum transmission parameters.

One or more embodiments include determining a predicted software update transmission runtime (Operation 710). The optimum transmission parameter system inputs current and/or expected service performance data, software update attributes, QoS requirements, and/or transmission parameters to a function f2 of the optimum transmission parameter model. The current and/or expected transmission parameters input into the function f2 may be the predicted optimum transmission parameters may be determined at Operation 708. Alternatively, the current and/or expected transmission parameters input into the function f2 may be actual transmission parameters currently being used, or other values determined based on user input and/or other applications. The function f2 outputs a predicted software update transmission runtime.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 8A:
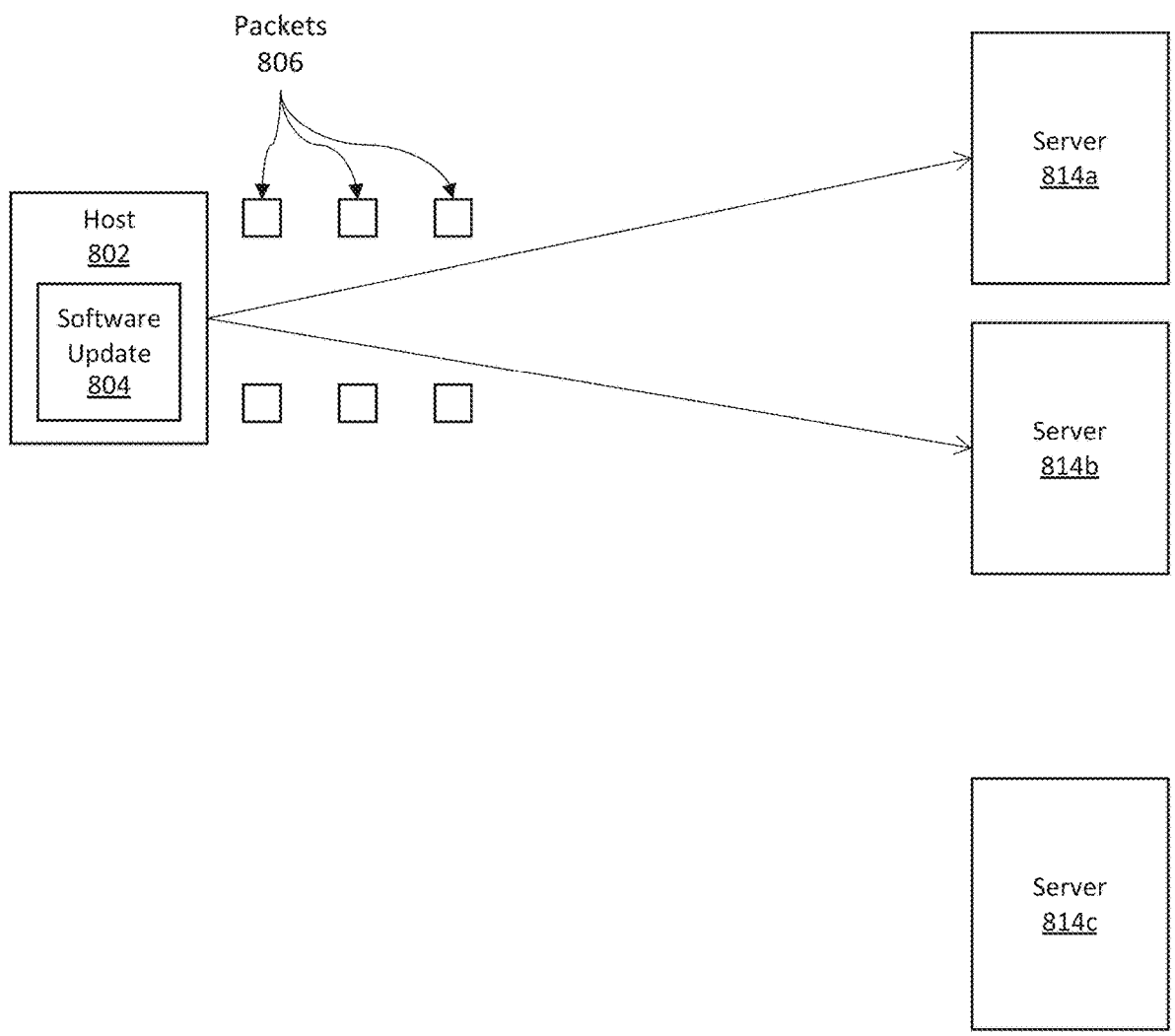
FIGS. 8A-C illustrate an example for determining optimum software update transmission parameters, in accordance with one or more embodiments.
Figure 8B:
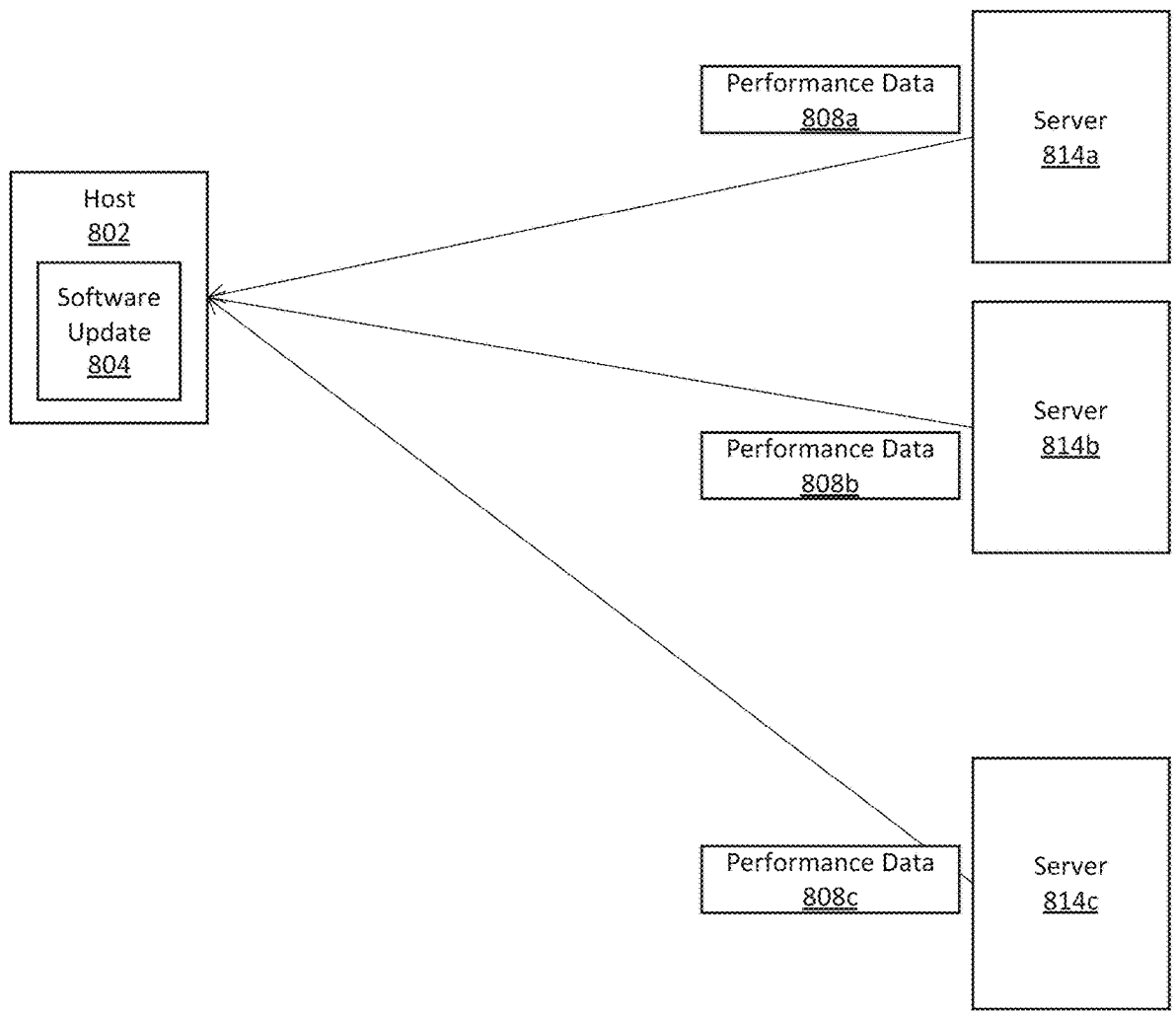
Figure 8C:
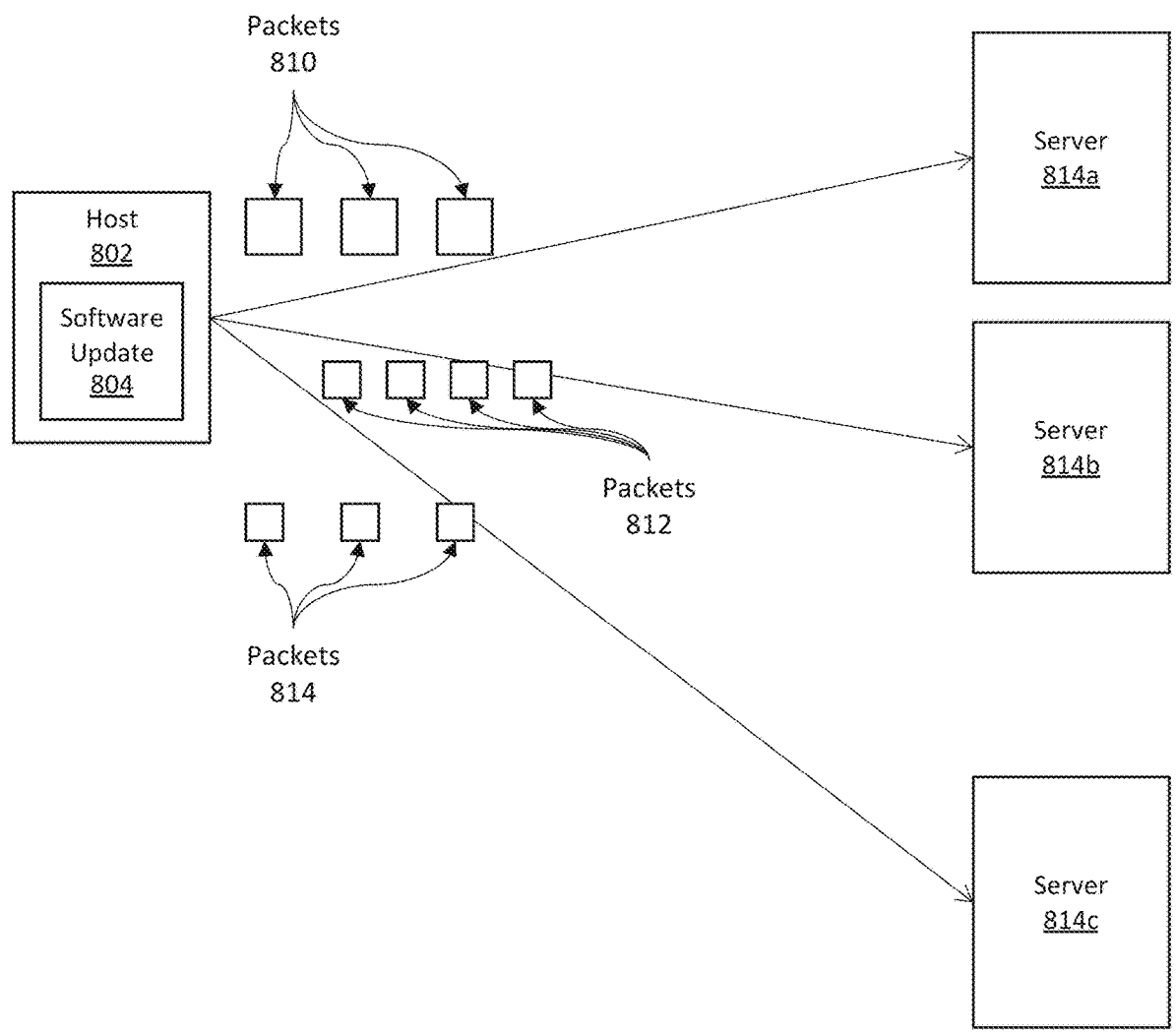

FIGS. 8A-C illustrate an example for determining optimum software update transmission parameters, in accordance with one or more embodiments. FIG. 8 shows a host 802, a software update 804, and servers 814a-c of a computer network. Software update 804 needs to be transmitted from host 802 to the servers 814a-c. Meanwhile, the servers 814a-c are live, serving requests of client devices of one or more tenants. The servers 814a-c of the computer network need to maintain certain QoS requirements for the tenants.

Host 802 transmits software update 804 to servers 814*a-c* using a set of transmission parameters. The transmission parameters include packet size, count of concurrent streams, time interval between packets, and recipient servers.

Referring to FIG. 8A, initially, host 802 determines initial values for the transmission parameters. Host 802 may determine the initial values for the transmission parameters using an optimum transmission parameter model. Alternatively host 802 may determine the initial values for the transmission parameters based on user input specifying the initial values. Additional and/or alternative methods for determining the initial values may be used.

Based on an initial packet size, host 802 packages portions of software update 804 into packets 806. Further, host 802 transmits each packet 806 with an initial time interval between the packets. Host 802 determines to initially use two concurrent streams, wherein the recipient servers are servers 814*a-b*, but not server 814*c*.

Referring to FIG. 8B, a monitoring engine determines performance data 808*a-c* respectively associated with servers 814*a-c*. The performance data 808*a-c* may include network latency, network operations per second, disk latency, and/or disk operations for second for write operations and/or read operations. Different sets of performance data 808*a-c* may be determined for different tenants of the computer network.

Host 802 compares obtains QoS requirements from a data repository. Different sets of QoS requirements may be determined for different tenants of the computer network. Performance data 808*a-c* for each tenant is compared against QoS requirements for the respective tenant. Host 802 determines whether performance data 808*a-c* for each satisfies the QoS requirements for the respective tenant. Host 802 determines how to adjust transmission parameters based on the comparisons. Host 802 determines whether criteria for speeding up the software update transmission, criteria for maintaining the software update transmission, or criteria for slowing down the software update transmission are satisfied.

Optionally, host 802 may also receive error data associated with servers 814*a-c*. Host 802 may receive error data associated with transmitting packets 806 from host 802 to servers 814*a-c*. Host 802 may receive error data associated with servers 814*a-c* serving requests from client devices of tenants of the computer network.

Referring to FIG. 8C, host 802 determines, for example, that service performance data 808*a-c* exceeds QoS requirements. Host 802 inputs results of the comparison between service performance data 808*a-c* and QoS requirements into one or more functions. Host 802 may also optionally input the error data into the one or more functions. The functions output adjustments for the transmission parameters. Different adjustments may be determined for different streams.

As illustrated, a function determines that an adjustment to the count of concurrent streams is to increment the count by one. Hence, there are now three concurrent streams. In an example, performance data 808*a-c* that exceeds QoS requirements leads to adjustments reducing transmission time, whereas performance data 808*a-c* that falls below QoS requirements leads to adjustments improving service performance. Based on performance data 808*a-c* exceeding QoS requirements, for example, the count of concurrent streams is increased to reduce transmission runtime.

Additionally, a function determines that an adjustment to the recipient servers is to add server 814*c* to the recipient servers. Hence, the recipient servers are now 814*a-c*. In an example, servers with lower error rates are first selected for addition as a recipient server. Based on a low error rate of server 814*c* in serving requests of client devices, for example, server 814*c* may be selected for addition as a recipient server.

Additionally, a function determines adjustments to the packet sizes for each of the three concurrent streams. The function determines, for example, to increase the packet size for the stream to 814*a*. The function determines, for example, to maintain the packet sizes for the streams to 814*b-c*. As illustrated, packets 810 for server 814*a* are of a larger packet size, and packets 812-814 for servers 814*b-c* are of a smaller size. In an example, the greater the disk latency, the smaller the packet size. Based on a smaller disk latency on server 814*a* and greater disk latencies on servers 814*b-c*, for example, the respective packet sizes for servers 814*a-c* may be determined.

Additionally, a function determines adjustments for time intervals between packets for each of the three concurrent streams. The function determines, for example, longer time intervals between packets to server 814*c*, medium time intervals between packets to server 814*a*, and shorter time intervals between packets to server 814*b*. In an example, the greater the network latency, the greater the time interval between packets. Based on a smaller network latency on server 814*b*, a medium network latency on server 814*a*, and a greater network latency on server 814*c*, for example, the respective time intervals for servers 814*a-c* may be determined.

Therefore, based on an updated packet size, host 802 packages portions of software update 804 into packets 810-814. Further, host 802 transmits each packet 810-814 with respective updated time intervals between the packets. Host 802 transmits the packets 810-814 in three concurrent streams to servers 814*a-c*, respectively.

Figure 9:
FIG. 9 illustrates an example of a training set for training an optimum transmission parameter model using machine learning, in accordance with one or more embodiments.

FIG. 9 illustrates an example of a training set for training an optimum transmission parameter model using machine learning, in accordance with one or more embodiments.

Training set 900 includes historical data for software update identifier, software update attribute, tenant, average service performance data, QoS requirement, and average software update transmission data. Each piece of historical data is associated with a timestamp.

Training set 900 is both time-aligned and tenant-aligned. As illustrated, training set 900 includes five time-aligned groups. A first group is associated with 10:00; a second group is associated with 10:05; a third group is associated with 10:10; a fourth group is associated with 12:30; a fifth group is associated with 12:35.

Hence, each piece of historical data associated with a timestamp between 10:00 and 10:04 may be categorized into the first group. Each piece of historical data associated with a timestamp between 10:05 and 10:09 may be categorized into the second group. Each piece of historical data associated with a timestamp between 10:10 and 10:14 may be categorized into the third group. Each piece of historical data associated with a timestamp between 12:30 and 12:34 may be categorized into the fourth group. Each piece of historical data associated with a timestamp between 12:35 and 12:39 may be categorized into the fifth group.

The table indicates the historical data for each time period. For example, at 10:00, a software update with identifier (ID) #123 was being transmitted. The priority level of the software update was "Normal." The average software update transmission speed was 30 Mpbs.

Further, as illustrated, training set 900 includes tenant-aligned subgroups, within each time-aligned group. Between 10:00 and 10:04, service requests from three tenants A, B, and C were received. Hence, within the 10:00 group, there are three subgroups for tenants A, B, and C. Similarly, within the 10:05 group, there are three subgroups for tenants A, B, and C. However, between 10:10 and 10:14, there were service requests from tenants A and C only, not tenant B. Hence, within the 10:10 group, there are two subgroups for tenants A and C.

Average service performance data and QoS requirements are aligned for each tenant. The table indicates, for example, for the 10:00 group, the average network latency for tenant A was 29 ms, and the QoS requirement was 30 ms; the average network latency for tenant B was 35 ms, and the QoS requirement was 40 ms; the average network latency for tenant C was 40 ms, and the QoS requirement was 50 ms.

Training set 900 may be input into a machine learning algorithm for determining one or more functions of an optimum transmission parameter model. A function may map the input variables software update attributes, average service performance data, and QoS requirements to average software update transmission data. The function thereby is configured to determine predicted optimum transmission parameters based on current and/or expected software update attributes, current and/or expected service performance data, and current and/or expected QoS requirements.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
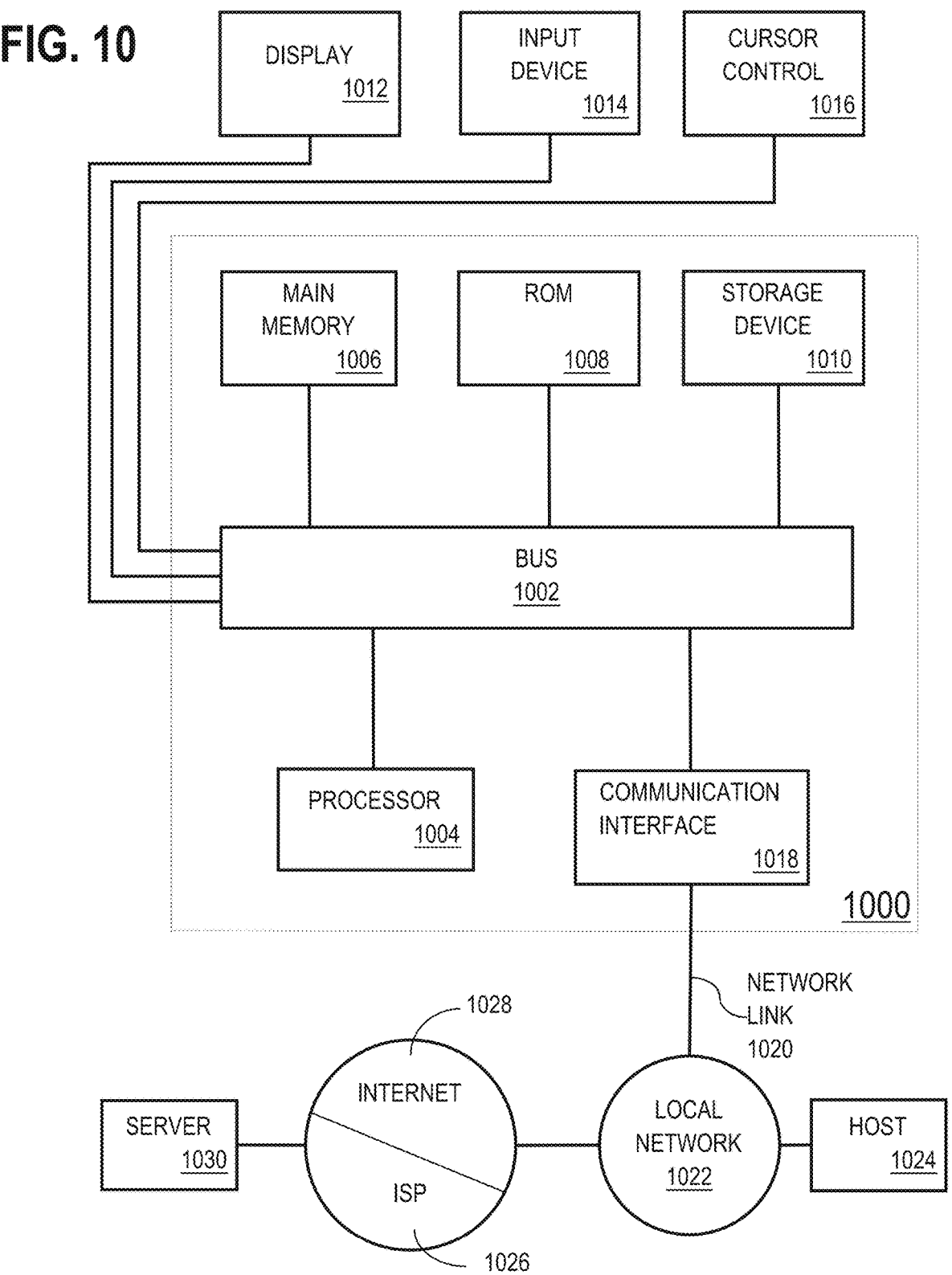
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    obtaining sets of historical service performance data for a plurality of tenants of a computer network over a historical time period, wherein each set of historical service performance data corresponds to a respective tenant of the plurality of tenants;

obtaining sets of historical quality of service (QoS) requirements for the plurality of tenants over the historical time period, wherein each set of historical QoS requirements corresponds to a respective tenant of the plurality of tenants;

obtaining a set of historical values for a first transmission parameter for transmitting one or more software updates to one or more servers of the computer network over the historical time period;

generating a training set comprising time-aligned groups of at least (a) the sets of historical service performance data, (b) the sets of historical QoS requirements, and (c) the set of historical values for the first transmission parameter;

applying a machine learning algorithm to the training set to generate an optimum transmission parameter model;

inputting sets of current or expected service performance data for the plurality of tenants, and sets of current or expected QoS requirements for the plurality of tenants, to the optimum transmission parameter model to determine one or more outputs comprising a first predicted value for the first transmission parameter.

2. The one or more media of claim 1, further storing instructions which cause:

determining a predicted transmission runtime for transmitting a target software update to the servers of the computer network based at least on the first predicted value for the first transmission parameter.

3. The one or more media of claim 1, further storing instructions which cause:

transmitting a target software update using the first predicted value for the first transmission parameter.

4. The one or more media of claim 3, further storing instructions which cause:

installing the software update on the servers of the computer network.

5. The one or more media of claim 1, further storing instructions which cause:

during a first time period: transmitting a first portion of a target software update, to the servers of the computer network, using the first predicted value for the first transmission parameter;

determining sets of first service performance data for the plurality of tenants of the computer network over the first time period, wherein each set of first service performance data corresponds to a respective tenant of the plurality of tenants;

based at least on a comparison between (a) the sets of first service performance data and (b) the sets of current or expected QoS requirements for the plurality of tenants: modifying the first predicted value to determine a first adjusted value for the first transmission parameter;

during a second time period subsequent to the first time period: transmitting a second portion of the target software update, to the servers of the computer network, using the first adjusted value for the first transmission parameter.

6. The one or more media of claim 5, wherein modifying the first predicted value to determine the first adjusted value for the first transmission parameter comprises:

responsive to determining that the sets of first service performance data does not satisfy the sets of current or expected QoS requirements for the plurality of tenants: determining the first adjusted value for the first transmission parameter to improve service performance levels corresponding to the second time period.

7. The one or more media of claim 5, further storing instructions which cause:

feeding the first adjusted value for the first transmission parameter back into the training set to update the optimum transmission parameter model.

8. The one or more media of claim 1, wherein the sets of historical service performance data and the sets of historical QoS requirements, in the training set, are further tenant-aligned.

9. The one or more media of claim 1, wherein the training set further comprises historical attributes of the software updates that are time-aligned with (a) the sets of historical service performance data, (b) the sets of historical QoS requirements, and (c) the set of historical values for first transmission parameter.

10. The one or more media of claim 1, further storing instructions which cause:

monitoring first service performance levels for the plurality of tenants over at least a first time period within the historical time period to determine at least a portion of the sets of historical service performance data over the first time period;

based at least on a comparison between (a) the portion of the sets of historical service performance data over the first time period and (b) a portion of the sets of historical QoS requirements over the first time period: determining at least one of the set of historical values for the first transmission parameter corresponding to a second time period within the historical time period.

11. The one or more media of claim 10, wherein determining the one of the set of historical values for the first transmission parameter comprises:

responsive to determining that the portion of the sets of historical service performance data does not satisfy the portion of the sets of historical QoS requirements: determining the one of the set of historical values for the first transmission parameter to improve second service performance levels for the plurality of tenants corresponding to the second time period.

12. The one or more media of claim 1, further storing instruction which cause:

obtaining a set of second historical values for a second transmission parameter for transmitting the software updates to the servers of the computer network over the historical time period;

wherein the training set comprises time-aligned groups of at least (a) the sets of historical service performance data, (b) the sets of historical QoS requirements, (c) the set of historical values for the first transmission parameter, and (d) the set of second historical values for the second transmission parameter;

wherein the optimum transmission parameter model is configured to determine the outputs further comprising a second predicted value for the second transmission parameter.

13. The one or more media of claim 1, wherein the sets of historical service performance data comprises at least one of:

a network write latency;
a number of network write operations per second;
a disk write latency; and
a number of disk write operations per second.

14. The one or more media of claim 1, wherein the first transmission parameter comprises at least one of:

a count of concurrent streams;
a packet size of packets used for transmitting the software updates;

a time interval between the packets; and
recipient servers, of the servers of the computer network, for receiving the concurrent streams.

15. The one or media of claim 1, wherein applying the machine learning algorithm to the training set to generate the optimum transmission parameter model comprises:
determining a function that best fits at least the sets of historical service performance data and the sets of historical QoS requirements to the set of historical values for the first transmission parameter.

16. The one or more media of claim 1, further storing instructions which cause:
monitoring first service performance levels for the plurality of tenants over at least a first time period within the historical time period to determine at least a portion of the sets of historical service performance data over the first time period;
based at least on a comparison between (a) the portion of the sets of historical service performance data over the first time period and (b) a portion of the sets of historical QoS requirements over the first time period: determining at least one of the set of historical values for the first transmission parameter corresponding to a second time period within the historical time period;
wherein determining the one of the set of historical values for the first transmission parameter comprises:
responsive to determining that the portion of the sets of historical service performance data does not satisfy the portion of the sets of historical QoS requirements:
determining the one of the set of historical values for the first transmission parameter to improve second service performance levels for the plurality of tenants corresponding to the second time period;
determining a predicted transmission runtime for transmitting a target software update to the servers of the computer network based at least on the first predicted value for the first transmission parameter;
during a third time period: transmitting a first portion of a target software update, to the servers of the computer network, using the first predicted value for the first transmission parameter;
determining sets of first service performance data for the plurality of tenants of the computer network over the third time period, wherein each set of first service performance data corresponds to a respective tenant of the plurality of tenants;
based at least on a comparison between (a) the sets of first service performance data and (b) the sets of current or expected QoS requirements for the plurality of tenants: modifying the first predicted value to determine a first adjusted value for the first transmission parameter;
during a fourth time period subsequent to the third time period: transmitting a second portion of the target software update, to the servers of the computer network, using the first adjusted value for the first transmission parameter;
wherein modifying the first predicted value to determine the first adjusted value for the first transmission parameter comprises:
responsive to determining that the sets of first service performance data does not satisfy the sets of current or expected QoS requirements for the plurality of tenants:
determining the first adjusted value for the first transmission parameter to improve third service performance levels corresponding to the fourth time period;
feeding the first adjusted value for the first transmission parameter back into the training set to update the optimum transmission parameter model;
obtaining a set of second historical values for a second transmission parameter for transmitting the software updates to the servers of the computer network over the historical time period;
wherein the training set comprises time-aligned groups of at least (a) the sets of historical service performance data, (b) the sets of historical QoS requirements, (c) the set of historical values for the first transmission parameter, (d) the set of second historical values for the second transmission parameter, and (e) historical attributes of the software updates;
wherein the sets of historical service performance data and the sets of historical QoS requirements, in the training set, are further tenant-aligned;
wherein the optimum transmission parameter model is configured to determine the outputs further comprising a second predicted value for the second transmission parameter.
wherein the sets of historical service performance data comprises at least one of:
a network write latency;
a number of network write operations per second;
a disk write latency; and
a number of disk write operations per second;
wherein the first transmission parameter comprises at least one of:
a count of concurrent streams;
a packet size of packets used for transmitting the software updates;
a time interval between the packets; and
recipient servers, of the servers of the computer network, for receiving the concurrent streams;
wherein applying the machine learning algorithm to the training set to generate the optimum transmission parameter model comprises: determining a function that best fits at least the sets of historical service performance data and the sets of historical QoS requirements to the set of historical values for the first transmission parameter.

17. A method, comprising:
obtaining sets of historical service performance data for a plurality of tenants of a computer network over a historical time period, wherein each set of historical service performance data corresponds to a respective tenant of the plurality of tenants;
obtaining sets of historical quality of service (QoS) requirements for the plurality of tenants over the historical time period, wherein each set of historical QoS requirements corresponds to a respective tenant of the plurality of tenants;
obtaining a set of historical values for a first transmission parameter for transmitting one or more software updates to one or more servers of the computer network over the historical time period;
generating a training set comprising time-aligned groups of at least (a) the sets of historical service performance data, (b) the sets of historical QoS requirements, and (c) the set of historical values for the first transmission parameter;

applying a machine learning algorithm to the training set to generate an optimum transmission parameter model;

wherein the optimum transmission parameter model is configured to determine one or more outputs comprising a first predicted value for the first transmission parameter based on inputs comprising sets of current or expected service performance data for the plurality of tenants, and sets of current or expected QoS requirements for the plurality of tenants;

wherein the method is performed by one or more devices, each including one or more hardware processors.

18. One or more non-transitory machine-readable media storing instructions which, when executed by one or more processors, cause:

obtaining a software update to be transmitted to and installed on a set of servers of a computer network;

determining, for transmitting the software update, a first set of one or more values for a set of one or more transmission parameters;

wherein the first set of values for the set of transmission parameters comprises one or more of:
　a first number for a count of concurrent streams;
　a packet size of packets used for transmitting the software update;
　a time interval between the packets; and
　recipient servers, of the set of servers, for receiving the concurrent streams;

during a first time period: transmitting at least a first portion of the software update to at least a first subset of the set of servers using the first set of values for the set of transmission parameters;

determining a first set of data for service performance levels, corresponding to the first time period, associated with at least the first subset of the set of servers serving requests of a set of one or more tenants of the computer network;

responsive at least to determining that the first set of data for the service performance levels does not satisfy a Quality of Service (QoS) requirement of the set of tenants: modifying the first set of values to determine a second set of values for the set of transmission parameters to improve the service performance levels;

during a second time period: transmitting at least a second portion of the software update to at least a second subset of the set of servers using the second set of values for the set of transmission parameters;

determining a second set of data for the service performance levels, corresponding to the second time period, associated with at least the second subset of the set of servers serving requests of the set of tenants;

responsive at least to determining that the second set of data for the service performance levels satisfies the QoS requirement: modifying the second set of values to determine a third set of values for the set of transmission parameters to reduce expected transmission runtime for the software update.

19. The one or more media of claim 18, wherein determining the second set of values for the set of transmission parameters to improve the service performance levels comprises at least one of:
　reducing the count of concurrent streams for transmitting the software update;
　reducing a packet size of packets used for transmitting the software update;
　increasing a time interval between the packets;
　modifying recipient servers, of the set of servers, for receiving the concurrent streams.

20. The one or more media of claim 18, wherein modifying the first set of values to determine the second set of values for the set of transmission parameters comprises:
　identifying a function that determines a delta associated with a particular transmission parameter, of the set of transmission parameters, based on a result of a comparison between (a) the first set of data for the service performance levels and (b) the QoS requirement;
　applying the delta to a particular value, of the first set of values, for the particular transmission parameter.

* * * * *

UNITED STATES PATENT AND TRADEMARK OFFICE
CERTIFICATE OF CORRECTION

| | |
|---|---|
| PATENT NO. | : 11,563,650 B2 |
| APPLICATION NO. | : 17/244946 |
| DATED | : January 24, 2023 |
| INVENTOR(S) | : Bentley et al. |

It is certified that error appears in the above-identified patent and that said Letters Patent is hereby corrected as shown below:

In the Specification

In Column 7, Line 64, delete "selecting" and insert -- Selecting --, therefor.

In the Claims

In Column 32, Line 26, in Claim 16, delete "parameter." and insert -- parameter; --, therefor.

Signed and Sealed this
Nineteenth Day of December, 2023

Katherine Kelly Vidal
*Director of the United States Patent and Trademark Office*